(12) United States Patent
Zhou et al.

(10) Patent No.: US 11,445,514 B2
(45) Date of Patent: Sep. 13, 2022

(54) BEAM DETERMINATION PRIOR TO BEAM ACTIVATION INDICATION

(71) Applicant: QUALCOMM Incorporated, San Diego, CA (US)

(72) Inventors: Yan Zhou, San Diego, CA (US); Tao Luo, San Diego, CA (US); Chun-Hao Hsu, San Jose, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 16/947,825

(22) Filed: Aug. 19, 2020

(65) Prior Publication Data
US 2021/0058930 A1    Feb. 25, 2021

Related U.S. Application Data

(60) Provisional application No. 62/891,114, filed on Aug. 23, 2019.

(51) Int. Cl.
*H04W 72/04* (2009.01)
*H04B 17/336* (2015.01)
(Continued)

(52) U.S. Cl.
CPC ...... *H04W 72/0493* (2013.01); *H04B 17/336* (2015.01); *H04W 24/10* (2013.01);
(Continued)

(58) Field of Classification Search
CPC ............. H04W 72/0493; H04W 24/10; H04W 56/001; H04W 72/042; H04W 72/0446;
(Continued)

(56) References Cited

U.S. PATENT DOCUMENTS

2019/0239093 A1* 8/2019 Zhang .................. H04L 5/0064
2020/0245270 A1* 7/2020 Harada ............... H04L 27/2613
(Continued)

FOREIGN PATENT DOCUMENTS

| WO | 2019099659 A1 | 5/2019 | |
|---|---|---|---|
| WO | WO-2019099659 A1 * | 5/2019 | ........ H04W 72/0493 |

OTHER PUBLICATIONS

International Search Report and Written Opinion—PCT/US2020/070436—ISA/EPO—dated Dec. 21, 2020.
(Continued)

*Primary Examiner* — Mewale A Ambaye
(74) *Attorney, Agent, or Firm* — Harrity & Harrity, LLP

(57) ABSTRACT

Various aspects of the present disclosure generally relate to systems, apparatuses, and methods for beam determination prior to an indication of an activated beam. A user equipment may receive a configuration for one or more transmission configuration indicator (TCI) states; receive downlink control information that schedules a downlink transmission after a time offset; determine, prior to receiving an indication of an activated TCI state of the one or more TCI states, a beam for receiving the downlink transmission; and receive the downlink transmission using the beam. Numerous other aspects are provided.

46 Claims, 14 Drawing Sheets

(51) Int. Cl.
*H04W 56/00* (2009.01)
*H04W 24/10* (2009.01)
*H04W 72/12* (2009.01)

(52) U.S. Cl.
CPC ....... *H04W 56/001* (2013.01); *H04W 72/042* (2013.01); *H04W 72/046* (2013.01); *H04W 72/0446* (2013.01); *H04W 72/1273* (2013.01)

(58) Field of Classification Search
CPC ........... H04W 72/046; H04W 72/1273; H04W 72/08; H04W 72/0453; H04W 16/28; H04B 17/336; H04L 43/06
See application file for complete search history.

(56) References Cited

U.S. PATENT DOCUMENTS

| | | | |
|---|---|---|---|
| 2021/0022094 A1* | 1/2021 | Luo | H04W 74/0816 |
| 2021/0022147 A1* | 1/2021 | Yao | H04W 72/0413 |
| 2021/0058930 A1* | 2/2021 | Zhou | H04B 7/0617 |
| 2021/0144563 A1* | 5/2021 | Islam | H04L 5/0048 |
| 2021/0152235 A1* | 5/2021 | Zhou | H04W 72/042 |
| 2021/0235298 A1* | 7/2021 | Venugopal | H04B 7/0695 |

OTHER PUBLICATIONS

Partial International Search Report—PCT/US2020/070436—ISA/EPO—dated Oct. 29, 2020.

\* cited by examiner

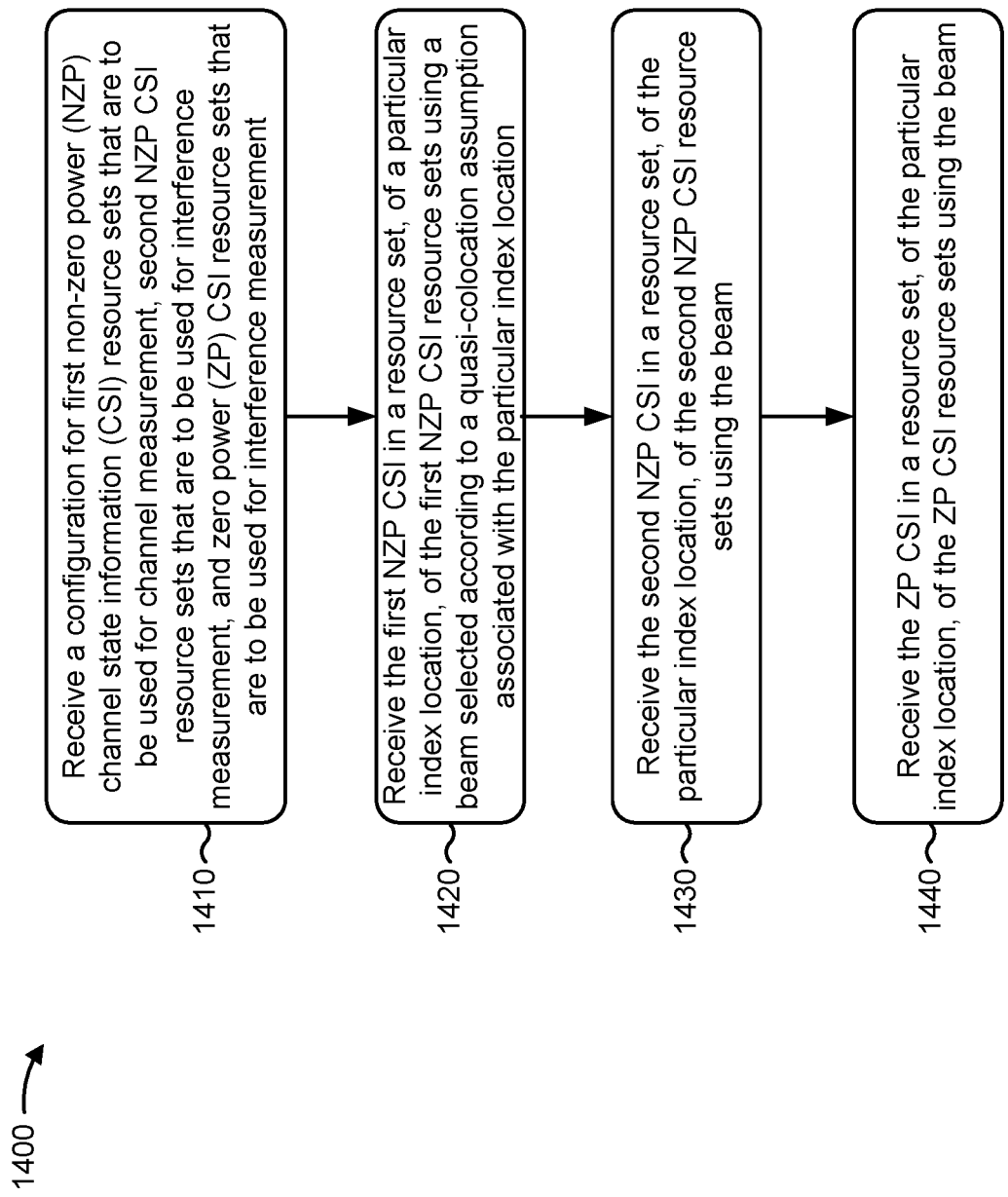

BEAM DETERMINATION PRIOR TO BEAM ACTIVATION INDICATION

CROSS-REFERENCE TO RELATED APPLICATION

This Patent Applications claims priority to U.S. Provisional Patent Application No. 62/891,114, filed on Aug. 23, 2019, entitled "BEAM DETERMINATION PRIOR TO BEAM ACTIVATION INDICATION," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for beam determination prior to an indication of an activated beam.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving a configuration for one or more transmission configuration indicator (TCI) states; receiving downlink control information that schedules a downlink transmission after a time offset; determining, prior to receiving an indication of an activated TCI state of the one or more TCI states, a beam for receiving the downlink transmission; and receiving the downlink transmission using the beam.

In some aspects, a method of wireless communication, performed by a base station, may include transmitting, to a UE, a configuration for one or more TCI states; transmitting, to the UE, downlink control information that schedules a downlink transmission after a time offset; determining, prior to transmitting an indication of an activated TCI state of the one or more TCI states to the UE, a beam for transmitting the downlink transmission; and transmitting, to the UE, the downlink transmission using the beam.

In some aspects, a UE for wireless communication may include memory and one or more processors operatively coupled to the memory. The memory and the one or more processors may be configured to receive a configuration for one or more TCI states; receive downlink control information that schedules a downlink transmission after a time offset; determine, prior to receiving an indication of an activated TCI state of the one or more TCI states, a beam for receiving the downlink transmission; and receive the downlink transmission using the beam.

In some aspects, a base station for wireless communication may include memory and one or more processors operatively coupled to the memory. The memory and the one or more processors may be configured to transmit, to a UE, a configuration for one or more TCI states; transmit, to the UE, downlink control information that schedules a downlink transmission after a time offset; determine, prior to transmitting an indication of an activated TCI state of the one or more TCI states to the UE, a beam for transmitting the downlink transmission; and transmit, to the UE, the downlink transmission using the beam.

In some aspects, a non-transitory computer-readable medium may store one or more instructions for wireless communication. The one or more instructions, when executed by one or more processors of a base station, may cause the one or more processors to receive a configuration for one or more TCI states; receive downlink control information that schedules a downlink transmission after a time offset; determine, prior to receiving an indication of an activated TCI state of the one or more TCI states, a beam for receiving the downlink transmission; and receive the downlink transmission using the beam.

In some aspects, a non-transitory computer-readable medium may store one or more instructions for wireless communication. The one or more instructions, when executed by one or more processors of a base station, may cause the one or more processors to transmit, to a UE, a configuration for one or more TCI states; transmit, to the UE, downlink control information that schedules a downlink transmission after a time offset; determine, prior to transmitting an indication of an activated TCI state of the one or more TCI states to the UE, a beam for transmitting the downlink transmission; and transmit, to the UE, the downlink transmission using the beam.

In some aspects, an apparatus for wireless communication may include means for receiving a configuration for one or more TCI states; means for receiving downlink control information that schedules a downlink transmission after a time offset; means for determining, prior to receiving an indication of an activated TCI state of the one or more TCI states, a beam for receiving the downlink transmission; and means for receiving the downlink transmission using the beam.

In some aspects, an apparatus for wireless communication may include means for transmitting, to a UE, a configuration for one or more TCI states; means for transmitting, to the UE, downlink control information that schedules a downlink transmission after a time offset; means for determining, prior to transmitting an indication of an activated TCI state of the one or more TCI states to the UE, a beam for transmitting the downlink transmission; and means for transmitting, to the UE, the downlink transmission using the beam.

In some aspects, a method of wireless communication, performed by a user equipment (UE), may include determining respective signal-to-interference-plus-noise ratio (SINR) measurements for a group of beams; and transmitting a measurement report for the group of beams that identifies the respective SINR measurements.

In some aspects, a method of wireless communication, performed by a user equipment (UE), may include receiving a configuration for first non-zero power (NZP) channel state information (CSI) resource sets that are to be used for channel measurement, second NZP CSI resource sets that are to be used for interference measurement, and zero power (ZP) CSI resource sets that are to be used for interference measurement; receiving the first NZP CSI in a resource set, of a particular index location, of the first NZP CSI resource sets using a beam selected according to a quasi-colocation assumption associated with the particular index location; receiving the second NZP CSI in a resource set, of the particular index location, of the second NZP CSI resource sets using the beam; and receiving the ZP CSI in a resource set, of the particular index location, of the ZP CSI resource sets using the beam.

In some aspects, a UE for wireless communication may include memory and one or more processors operatively coupled to the memory. The memory and the one or more processors may be configured to determine respective signal-to-interference-plus-noise ratio (SINR) measurements for a group of beams; and transmit a measurement report for the group of beams that identifies the respective SINR measurements.

In some aspects, a UE for wireless communication may include memory and one or more processors operatively coupled to the memory. The memory and the one or more processors may be configured to receive a configuration for first non-zero power (NZP) channel state information (CSI) resource sets that are to be used for channel measurement, second NZP CSI resource sets that are to be used for interference measurement, and zero power (ZP) CSI resource sets that are to be used for interference measurement; receive the first NZP CSI in a resource set, of a particular index location, of the first NZP CSI resource sets using a beam selected according to a quasi-colocation assumption associated with the particular index location; receive the second NZP CSI in a resource set, of the particular index location, of the second NZP CSI resource sets using the beam; and receive the ZP CSI in a resource set, of the particular index location, of the ZP CSI resource sets using the beam.

In some aspects, a non-transitory computer-readable medium may store one or more instructions for wireless communication. The one or more instructions, when executed by one or more processors of a UE, may cause the one or more processors to: determine respective signal-to-interference-plus-noise ratio (SINR) measurements for a group of beams; and transmit a measurement report for the group of beams that identifies the respective SINR measurements.

In some aspects, a non-transitory computer-readable medium may store one or more instructions for wireless communication. The one or more instructions, when executed by one or more processors of a UE, may cause the one or more processors to: receive a configuration for first non-zero power (NZP) channel state information (CSI) resource sets that are to be used for channel measurement, second NZP CSI resource sets that are to be used for interference measurement, and zero power (ZP) CSI resource sets that are to be used for interference measurement; receive the first NZP CSI in a resource set, of a particular index location, of the first NZP CSI resource sets using a beam selected according to a quasi-colocation assumption associated with the particular index location; receive the second NZP CSI in a resource set, of the particular index location, of the second NZP CSI resource sets using the beam; and receive the ZP CSI in a resource set, of the particular index location, of the ZP CSI resource sets using the beam.

In some aspects, an apparatus for wireless communication may include means for determining respective signal-to-interference-plus-noise ratio (SINR) measurements for a group of beams; and means for transmitting a measurement report for the group of beams that identifies the respective SINR measurements.

In some aspects, an apparatus for wireless communication may include means for receiving a configuration for first non-zero power (NZP) channel state information (CSI) resource sets that are to be used for channel measurement, second NZP CSI resource sets that are to be used for interference measurement, and zero power (ZP) CSI resource sets that are to be used for interference measurement; means for receiving the first NZP CSI in a resource set, of a particular index location, of the first NZP CSI resource sets using a beam selected according to a quasi-colocation assumption associated with the particular index location; means for receiving the second NZP CSI in a resource set, of the particular index location, of the second NZP CSI resource sets using the beam; and means for receiving the ZP CSI in a resource set, of the particular index location, of the ZP CSI resource sets using the beam.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 14 is a diagram illustrating an example of receiving channel state information (CSI) in resource sets, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Figure 1:
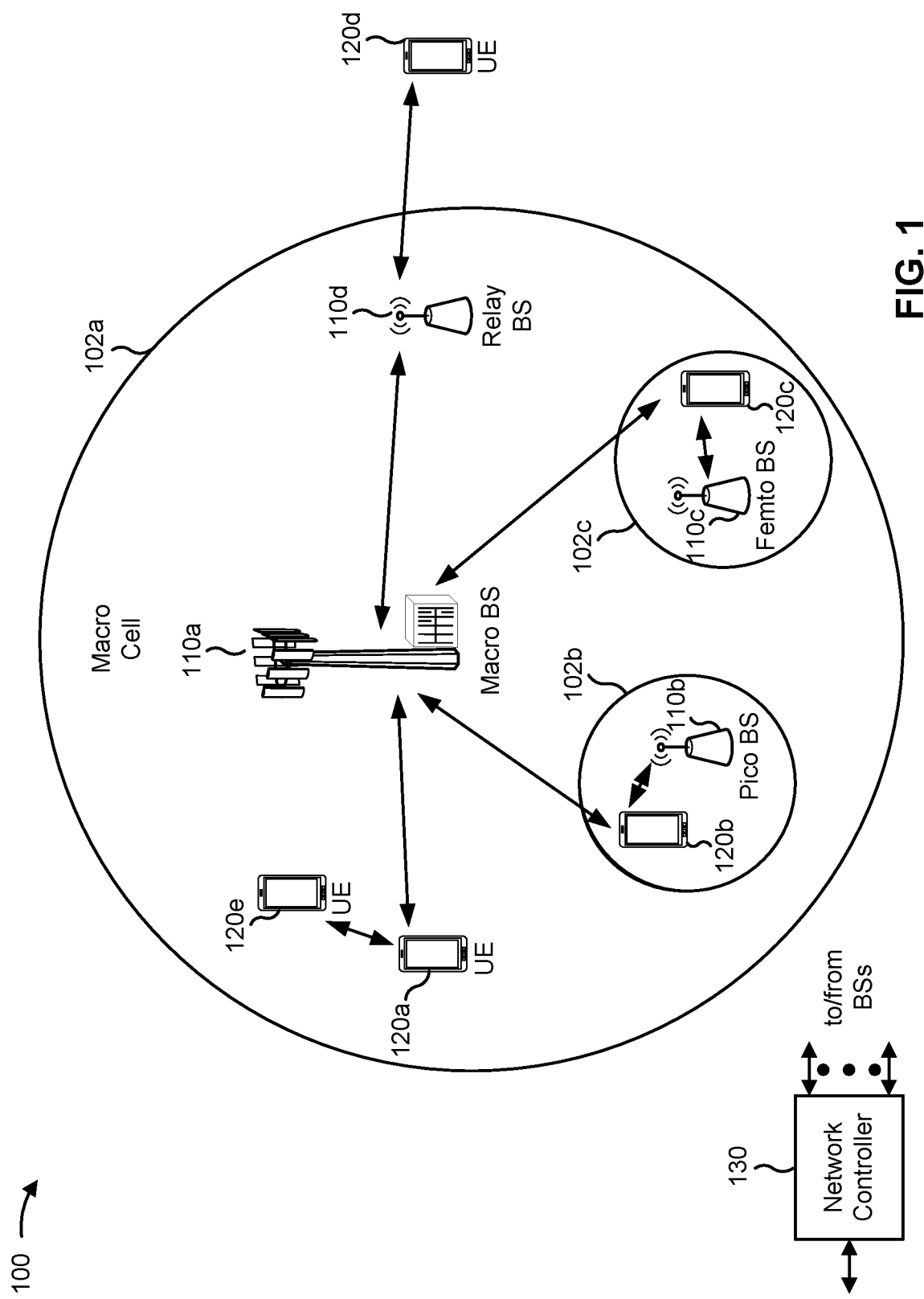
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
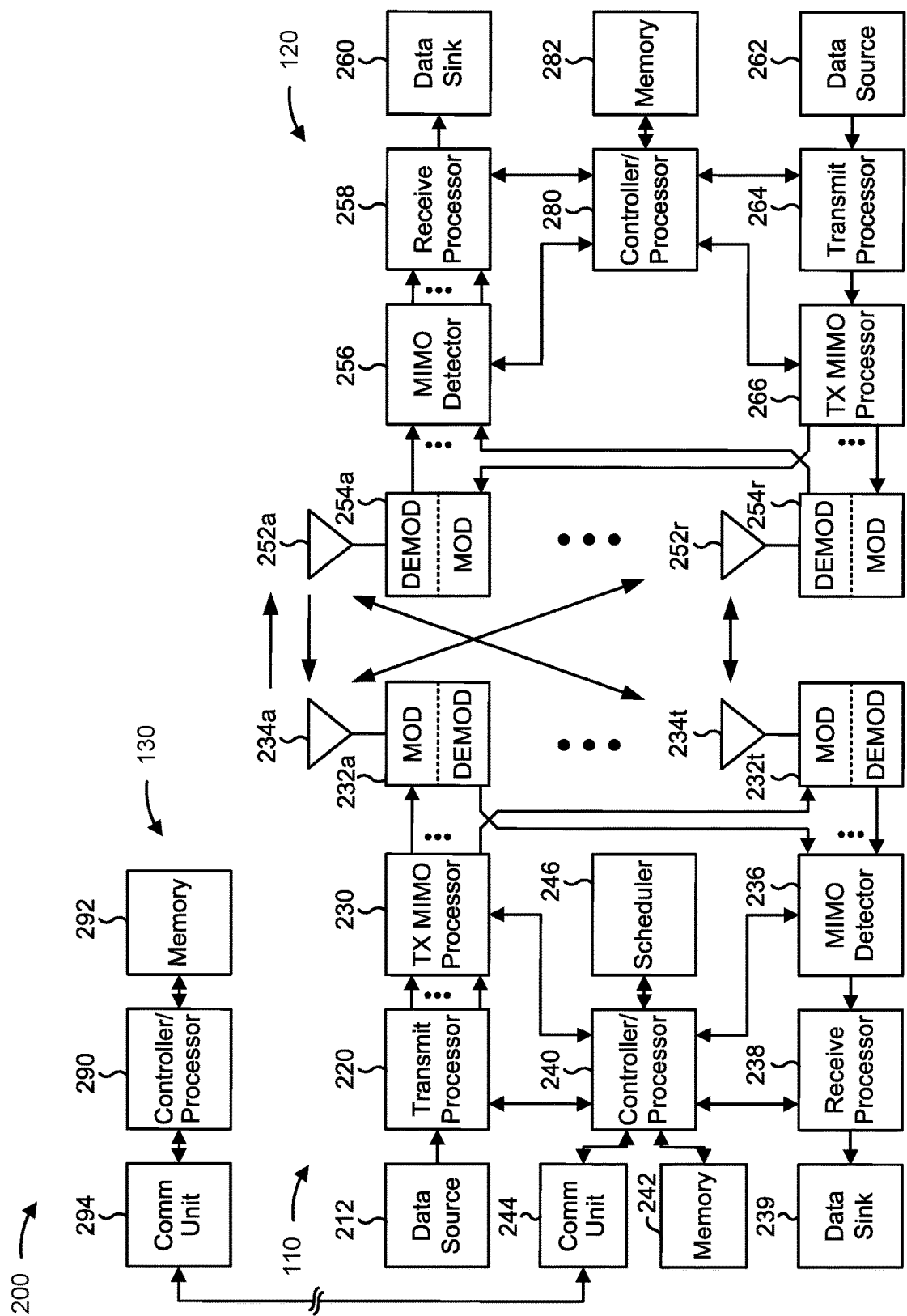
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with beam determination prior to an indication of an activated beam, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving (e.g., using antenna 252, DEMOD 254, MIMO detector 256, receive processor 258, controller/processor 280, reception module 604, and/or the like) a configuration for one or more TCI states, means for receiving (e.g., using antenna 252, DEMOD 254, MIMO detector 256, receive processor 258, controller/processor 280, reception module 604, and/or the like) downlink control information that schedules a downlink transmission after a time offset, means for determining (e.g., using receive processor 258, transmit processor 264, controller/processor 280, memory 282, determination module 606, and/or the like), prior to receiving an indication of an activated TCI state of the one or more TCI states, a beam for receiving the downlink transmission, means for receiving (e.g., using antenna 252, DEMOD 254, MIMO detector 256, receive processor 258, controller/processor 280, reception module 604, and/or the like) the downlink transmission using the beam, and/or the like. In some aspects, UE 120 may include means for determining (e.g., using receive processor 258, transmit processor 264, controller/processor 280, memory 282, determination component 1208, and/or the like) respective signal-to-interference-plus-noise ratio (SINR) measurements for a group of beams, means for transmitting (e.g., using controller/processor 280, transmit processor 264, TX MIMO processor 266, MOD 254, antenna 252, transmission component 1204, and/or the like) a measurement report for the group of beams that identifies the respective SINR measurements, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting (e.g., using controller/processor 240, transmit processor 220, TX MIMO processor 230, MOD 232, antenna 234, transmission module 804, and/or the like) a configuration for one or more TCI states, means for transmitting (e.g., using controller/processor 240, transmit processor 220, TX MIMO processor 230, MOD 232, antenna 234, transmission module 804, and/or the like) downlink control information that schedules a downlink transmission after a time offset, means for determining (e.g., using transmit processor 220, receive processor 238, controller/processor 240, memory 242, determination module 806, and/or the like), prior to transmitting an indication of an activated TCI state of the one or more TCI states, a beam for transmitting the downlink transmission, means for transmitting (e.g., using controller/processor 240, transmit processor 220, TX MIMO processor 230, MOD 232, antenna 234, transmission module 804, and/or the like) the downlink transmission using the beam, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In 5G and other types of radio access technologies (RATs), beamforming may be used for communications between a UE and a base station, such as for millimeter wave communications and/or the like. In such a case, the base station may provide the UE with a configuration of TCI states that respectively indicate beams that may be used by the UE, such as for receiving a physical downlink shared channel (PDSCH). The base station may indicate an activated TCI state to the UE (e.g., via a medium access control-control element (MAC-CE)), which the UE may use to select a beam for receiving the PDSCH. However, in some cases, downlink control information (DCI) may schedule a PDSCH prior to activation of a TCI state for the PDSCH.

Some apparatuses and techniques described herein facilitate selection of a beam for receiving a PDSCH prior to activation of a TCI state for the PDSCH. For example, a UE may determine a beam that is to be used to receive a PDSCH, prior to activation of a TCI state for the PDSCH, according to a selected beam used to receive synchronization signal blocks (SSBs) in an initial access procedure or according to a selected beam used to monitor a control resource set (CORESET). In some aspects, the UE may determine the beam according to a time offset between receiving DCI that schedules a PDSCH and receiving the PDSCH and/or according to whether the control information is configured to identify a TCI state.

Figure 3:
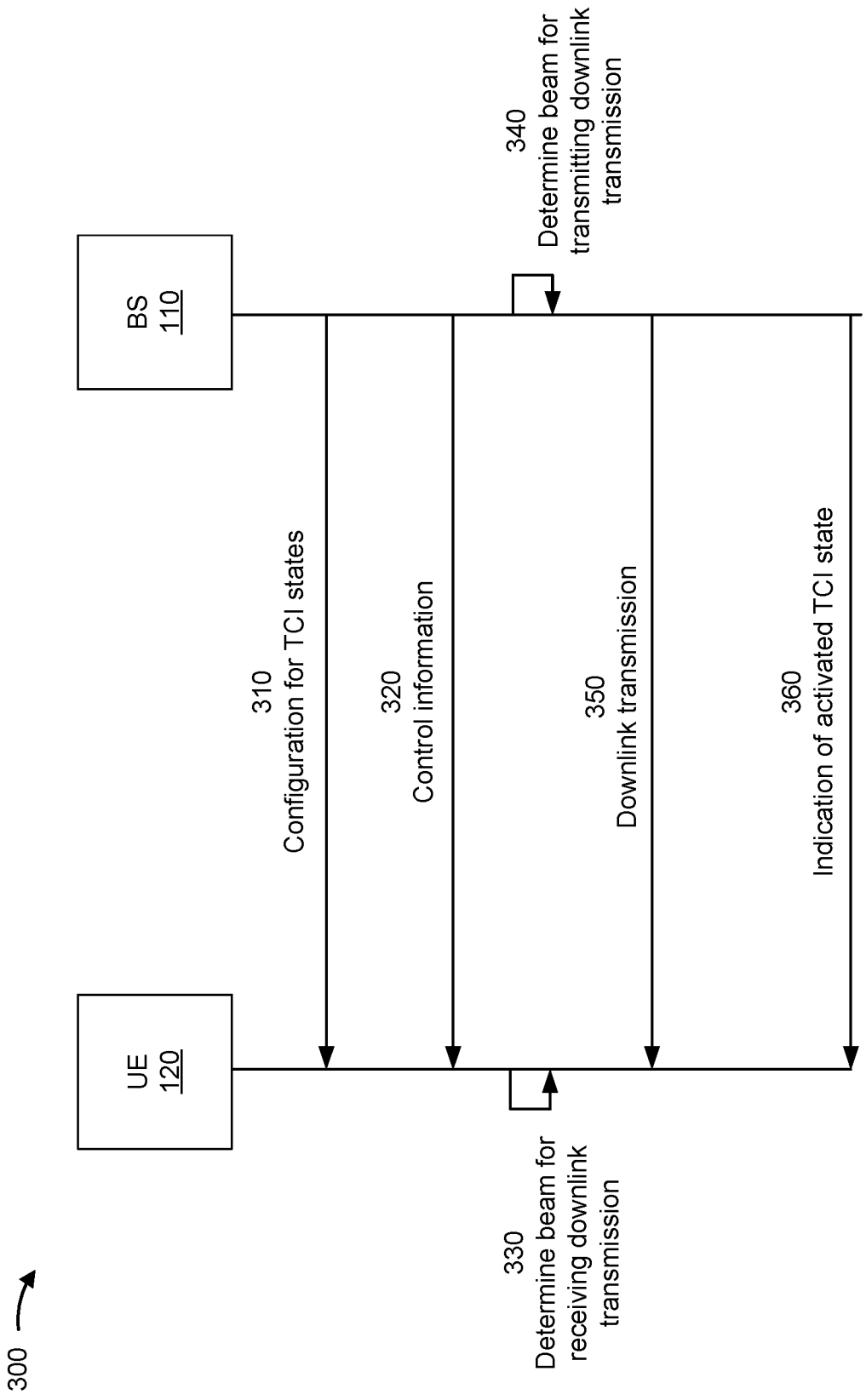
FIG. 3 is a diagram illustrating an example of determining a beam prior to an indication of an activated beam, in accordance with various aspects of the present disclosure.

FIG. 3 is a diagram illustrating an example 300 of determining a beam prior to an indication of an activated beam, in accordance with various aspects of the present disclosure. For example, as shown in FIG. 3, a BS 110 and a UE 120 may communicate using beams determined prior to activation of a TCI state. In some aspects, communications between the BS 110 and the UE 120 may occur after an initial access procedure performed by the BS 110 and the UE 120. For example, the BS 110 may transmit, and the UE 120 may receive, one or more SSBs as part of the initial access procedure. In some aspects, the BS 110 may transmit the SSBs using a beam previously selected by the BS 110, and the UE 120 may receive the SSBs using a beam previously selected by the UE 120.

As shown in FIG. 3, and by reference number 310, the BS 110 may transmit, and the UE 120 may receive, a configuration (e.g., a higher-layer configuration) that identifies one or more TCI states. For example, the BS 110 may transmit the configuration via radio resource control (RRC) signaling or a MAC-CE.

As shown by reference number 320, the BS 110 may transmit, and the UE 120 may receive, control information (e.g., DCI) that schedules a downlink transmission carried in a PDSCH. In some aspects, the control information may schedule the downlink transmission after a time offset. The time offset may be an interval between a first time when the control information is received by the UE 120 and a second time when the PDSCH is scheduled.

The UE 120 may receive the control information in a CORESET monitored by the UE 120. For example, the UE 120 may have monitored the CORESET using a beam previously selected by the UE 120. Similarly, the BS 110 may have transmitted the control information in the CORESET using a beam previously selected by the BS 110. In some aspects, the CORESET may be included in a plurality of CORESETs of a search space monitored by the UE 120 (e.g., using respective beams).

In some aspects, a tci-PresentInDCI field may not be configured for the CORESET (e.g., the tci-PresentInDCI field is disabled). That is, TCI indication in control information is not configured for the CORESET. In such a case, the control information may not identify a TCI state of the one or more TCI states configured for the UE 120. In some aspects, the tci-PresentInDCI field may be enabled for the CORESET. That is, TCI indication in control information is enabled for the CORESET. In such a case, the control information may identify a TCI state of the one or more TCI states configured for the UE 120.

As shown by reference number 330, the UE 120 may determine a beam that is to be used to receive the downlink transmission carried in the PDSCH. The UE 120 may determine the beam prior to receiving an indication (e.g., an activation command) from the BS 110 of an activated TCI state of the one or more TCI states configured for the UE 120 (e.g., prior to receiving an indication of a beam that is to be used to receive the PDSCH). The UE 120 may determine the beam based at least in part on the time offset associated with the control information and/or the tci-PresentInDCI configuration (e.g., enabled or not enabled) of the CORESET.

In some aspects, the time offset satisfies a threshold value (e.g., the time offset is greater than or equal to the threshold value) and the tci-PresentInDCI field is not configured for the CORESET (e.g., the control information may not identify a TCI state). In such a case, the UE 120 may determine a beam, for the PDSCH, that corresponds to a beam selected by the UE 120 for receiving SSBs from the BS 110 as part of the initial access procedure. For example, the determined beam may be quasi-co-located with the beam used to receive SSBs in the initial access procedure. That is, the beam may be determined based at least in part on a quasi-co-location (QCL) assumption that follows the SSBs in the initial access procedure (e.g., demodulation reference signal ports for the PDSCH are quasi-co-located with the SSBs). Additionally, in aspects in which the time offset satisfies the threshold value and the tci-PresentInDCI field is not configured for the CORESET, the UE 120 may determine a beam, for the PDSCH, that corresponds to a beam selected by the UE 120 for monitoring the CORESET (i.e., the CORESET that carried the control information). For example, the determined beam may be quasi-co-located with the beam used to monitor the CORESET. That is, the beam may be determined based at least in part on a QCL assumption that follows the CORESET. In some aspects, the threshold value may be associated with a beam switching latency of the UE 120 (e.g., the threshold value may be a time duration for QCL (timeDurationForQCL)).

In some aspects, the UE 120 may have a configuration, for when the time offset satisfies the threshold value and the tci-PresentInDCI field is not configured for the CORESET, that identifies whether the UE 120 is to determine a beam according to the initial access procedure or according to the CORESET. In this way, when the time offset satisfies the threshold value and the tci-PresentInDCI field is not configured for the CORESET, the UE 120 may determine the beam in a consistent manner that enables the BS 110 to infer the beam determined by the UE 120.

In some aspects, the time offset may satisfy the threshold value and the tci-PresentInDCI field may be enabled for the CORESET (e.g., the control information may identify a TCI state). In such a case, the UE 120 may determine a beam, for the PDSCH, that corresponds to a beam selected by the UE 120 for receiving SSBs from the BS 110 as part of the initial access procedure, or that corresponds to a beam selected by the UE 120 for monitoring the CORESET, as described above.

In some aspects, the UE 120 may have a configuration, for when the time offset satisfies the threshold value and the tci-PresentInDCI field is enabled for the CORESET, that identifies whether the UE 120 is to determine a beam according to the initial access procedure or according to the CORESET. In this way, when the time offset satisfies the threshold value and the tci-PresentInDCI field is enabled, the UE 120 may determine the beam in a consistent manner that enables the BS 110 to infer the beam determined by the UE 120.

In some aspects, the time offset does not satisfy the threshold value (e.g., the time offset is less than the threshold value). In such a case, the UE 120 may determine a beam, for the PDSCH, that corresponds to a beam selected by the UE 120 for receiving SSBs from the BS 110 as part of the initial access procedure, as described above. Additionally, in aspects in which the time offset does not satisfy the threshold value, the UE 120 may determine a beam, for the PDSCH, that corresponds to a beam selected by the UE 120 to monitor a CORESET having a lowest identifier among identifiers of a plurality of CORESETs monitored by the UE 120 (e.g., a search space monitored by the UE 120). For example, the determined beam may be quasi-co-located with the beam used to monitor the CORESET having the lowest identifier. That is, the beam may be determined based at least in part on a QCL assumption that follows the CORESET having the lowest identifier. The plurality of CORESETs may be associated with an interval (e.g., a slot) most recently monitored by the UE 120 (e.g., prior to determining the beam).

In some aspects, the UE 120 may have a configuration, for when the time offset does not satisfy the threshold value, that identifies whether the UE 120 is to determine a beam according to the initial access procedure or according to the CORESET having the lowest identifier. In this way, when the time offset does not satisfy the threshold value, the UE 120 may determine the beam in a consistent manner that enables the BS 110 to infer the beam determined by the UE 120.

As shown by reference number 340, the BS 110 may determine a beam that is to be used to transmit the downlink transmission carried in the PDSCH. The BS 110 may determine the beam prior to transmitting an indication to the UE 120 of an activated TCI state of the one or more TCI states configured for the UE 120. The BS 110 may determine the beam based at least in part on the time offset associated with the control information and/or the tci-PresentInDCI configuration of the CORESET, as described above.

For example, when the time offset satisfies the threshold value and the tci-PresentInDCI field is not configured for the CORESET, the BS 110 may determine a beam that corresponds to one of a beam selected by the BS 110 for transmitting SSBs in the initial access procedure or a beam selected by the BS 110 for transmitting the control information in the CORESET. As another example, when the time offset satisfies the threshold value and the tci-PresentIn-DCI field is enabled for the CORESET, the BS 110 may determine a beam that corresponds to one of a beam selected by the BS 110 for transmitting SSBs in the initial access procedure or a beam selected by the BS 110 for transmitting the control information in the CORESET. As a further example, when the time offset does not satisfy the threshold value, the BS 110 may determine a beam that corresponds to one of a beam selected by the BS 110 for transmitting SSBs in the initial access procedure or a beam selected by the BS 110 and associated with a CORESET having a lowest identifier among identifiers of a plurality of CORESETs monitored by the UE 120, as described above.

In each example above, the BS 110 may be configured to determine a beam in a manner corresponding to that configured for the UE 120, as described above. For example, when the time offset does not satisfy the threshold value, if the UE 120 is configured to determine a beam that corresponds to a beam used to receive SSBs in an initial access procedure, the BS 110 may determine a beam that corresponds to a beam used to transmit SSBs in the initial access procedure.

As shown by reference number 350, the BS 110 may transmit, and the UE 120 may receive, the downlink transmission in the PDSCH. For example, the BS 110 may transmit the downlink transmission using the beam determined by the BS 110 and the UE 120 may receive the downlink transmission using the beam determined by the UE 120. In this way, the BS 110 may transmit, and the UE 120 may receive, the downlink transmission prior to activation of a TCI state for the PDSCH.

As shown by reference number 360, the BS 110 may transmit, and the UE 120 may receive, an indication (e.g., an activation command) of an activated TCI state of the one or more TCI states configured for the UE 120. The BS 110 may transmit the indication via a MAC-CE. In some aspects, the BS 110 may transmit the indication of the activated TCI state without regard to whether the tci-PresentInDCI field is enabled or not enabled for the CORESET. For example, the BS 110 may transmit the indication in a case in which the tci-PresentInDCI field is not configured for the CORESET, and may transmit the indication in a case in which the tci-PresentInDCI field is enabled for the CORESET.

In some aspects, the BS 110 may transmit the indication with (e.g., simultaneously with or near-simultaneously with) an indication (e.g., an activation command) of an activated TCI state for a physical downlink control channel (PDCCH) monitored by the UE 120. The activated TCI state indicated for the PDSCH may correspond (e.g., may be identical) to the activated TCI state indicated for the PDCCH.

In some aspects, upon activation of a TCI state for the PDSCH, the UE 120 may determine, and use, a beam that corresponds to a beam selected by the UE 120 for monitoring the CORESET, as described above, if, prior to activation of the TCI state, the UE 120 determined a beam corresponding to a beam selected by the UE 120 for receiving SSBs in an initial access procedure. For example, when the time offset satisfies the threshold value and the tci-PresentInDCI field is not configured for the CORESET, the UE 120 may determine, and use, the beam that corresponds to a beam selected by the UE 120 for monitoring the CORESET. Moreover, upon activation of a TCI state for the PDSCH, the BS 110 may similarly determine, and use, a beam that corresponds to a beam selected by the BS 110 for transmitting the control information in the CORESET.

In some aspects, upon activation of a TCI state for the PDSCH, the UE 120 may determine, and use, a beam that corresponds to a beam selected by the UE 120 for monitoring the CORESET having the lowest identifier, as described above, if, prior to activation of the TCI state, the UE 120 determined a beam corresponding to a beam selected by the UE 120 for receiving SSBs in an initial access procedure. For example, when the time offset does not satisfy the threshold value, the UE 120 may determine, and use, the beam that corresponds to a beam selected by the UE 120 for monitoring the CORESET having the lowest identifier. Moreover, upon activation of a TCI state for the PDSCH, the BS 110 may similarly determine, and use, a beam that corresponds to a beam selected by the BS 110 and associated with the CORESET having the lowest identifier.

As indicated above, FIG. 3 is provided as an example. Other examples may differ from what is described with respect to FIG. 3.

Figure 4:
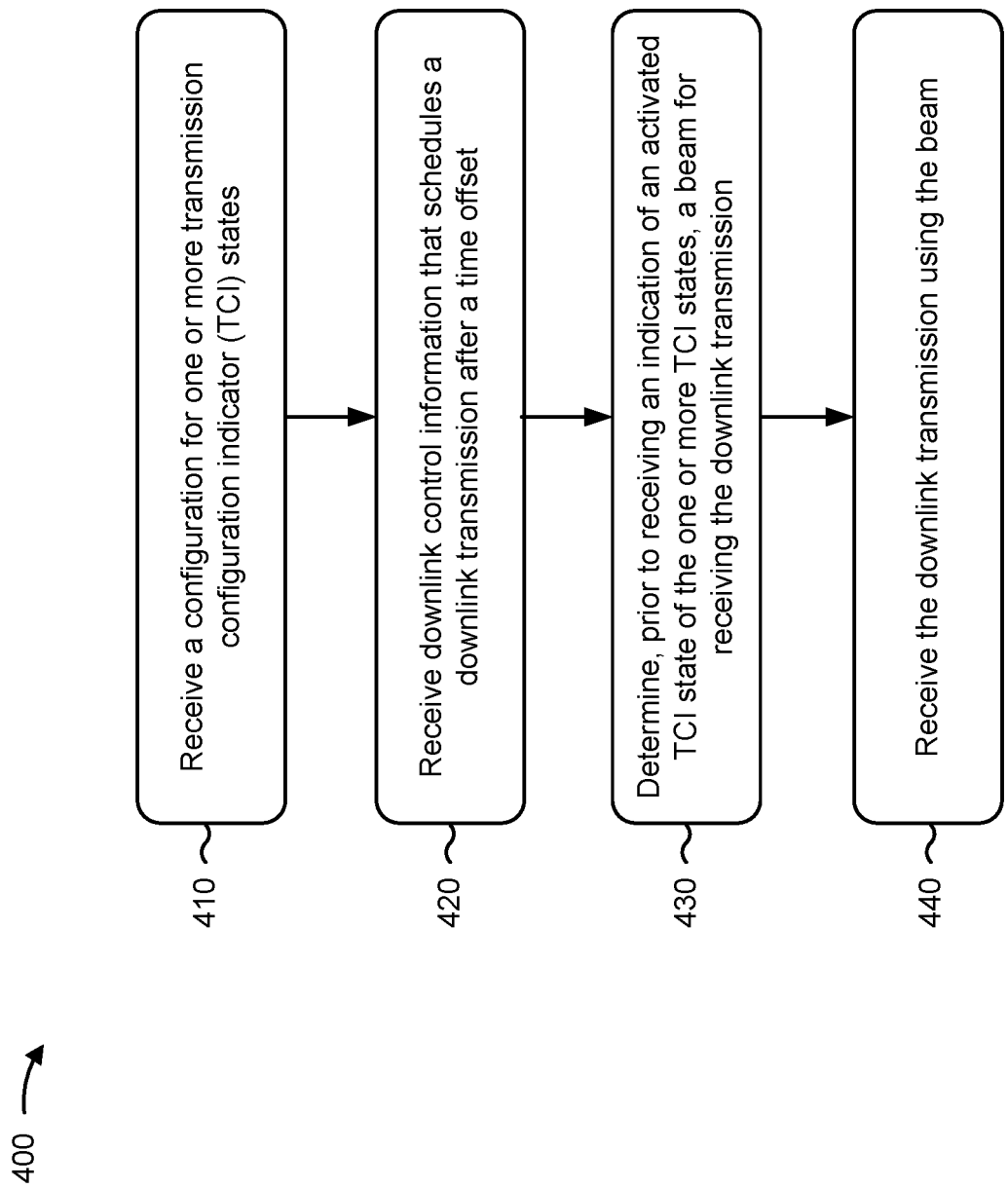
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with beam determination prior to an indication of an activated beam.

As shown in FIG. 4, in some aspects, process 400 may include receiving a configuration for one or more TCI states (block 410). For example, the UE (e.g., using antenna 252, DEMOD 254, MIMO detector 256, receive processor 258, controller/processor 280, reception module 604, and/or the like) may receive a configuration for one or more TCI states, as described above in connection with FIG. 3.

As further shown in FIG. 4, in some aspects, process 400 may include receiving downlink control information that schedules a downlink transmission after a time offset (block 420). For example, the UE (e.g., using antenna 252, DEMOD 254, MIMO detector 256, receive processor 258, controller/processor 280, reception module 604, and/or the like) may receive downlink control information that schedules a downlink transmission after a time offset, as described above in connection with FIG. 3. In a first aspect, the downlink transmission is carried in a physical downlink shared channel for data. In a second aspect, alone or in combination with the first aspect, the time offset is an interval between a first time when the downlink control information that schedules the downlink transmission is received and a second time when the downlink transmission is scheduled.

As further shown in FIG. 4, in some aspects, process 400 may include determining, prior to receiving an indication of an activated TCI state of the one or more TCI states, a beam for receiving the downlink transmission (block 430). For example, the UE (e.g., using controller/processor 280 and/or the like) may determine, prior to receiving an indication of an activated TCI state of the one or more TCI states, a beam for receiving the downlink transmission, as described above in connection with FIG. 3.

In a third aspect, alone or in combination with one or more of the first and second aspects, the time offset is greater than a threshold value and the downlink control information that schedules the downlink transmission is carried in a control resource set for which TCI indication in downlink control information is not enabled, and the beam that is determined corresponds to a beam used to receive a synchronization signal block in an initial access procedure. In a fourth aspect, alone or in combination with one or more of the first through third aspects, process 400 further includes receiving (e.g., using antenna 252, DEMOD 254, MIMO detector 256, receive processor 258, controller/processor 280, reception module 604, and/or the like) the indication of the activated TCI state, and determining (e.g., using receive processor 258, transmit processor 264, controller/processor 280, memory 282, determination module 606, and/or the like) another beam that corresponds to a beam used to monitor the control resource set. In a fifth aspect, alone or in combination with one or more of the first through fourth aspects, the time offset is greater than a threshold value and the downlink control information that schedules the downlink transmission is carried in a control resource set for which TCI indication in downlink control information is not enabled, and the beam that is determined corresponds to a beam used to monitor the control resource set.

In a sixth aspect, alone or in combination with one or more of the first through fifth aspects, the time offset is greater than a threshold value and the downlink control information that schedules the downlink transmission is carried in a control resource set for which TCI indication in downlink control information is enabled, and the beam that is determined corresponds to a beam used to receive a synchronization signal block in an initial access procedure. In a seventh aspect, alone or in combination with one or more of the first through sixth aspects, the time offset is greater than a threshold value and the downlink control information that schedules the downlink transmission is carried in a control resource set for which TCI indication in downlink control information is enabled, and the beam that is determined corresponds to a beam used to monitor the control resource set.

In an eighth aspect, alone or in combination with one or more of the first through seventh aspects, the time offset is less than a threshold value, and the beam that is determined corresponds to a beam used to receive a synchronization signal block in an initial access procedure. In a ninth aspect, alone or in combination with one or more of the first through eighth aspects, process 400 further includes receiving (e.g., using antenna 252, DEMOD 254, MIMO detector 256, receive processor 258, controller/processor 280, reception module 604, and/or the like) the indication of the activated TCI state, and determining (e.g., using receive processor 258, transmit processor 264, controller/processor 280, memory 282, determination module 606, and/or the like) another beam that corresponds to a beam used to monitor a control resource set. In a tenth aspect, alone or in combination with one or more of the first through ninth aspects, the control resource set has a lowest identifier among identifiers of a plurality of control resource sets in a most recent slot that is monitored. In an eleventh aspect, alone or in combination with one or more of the first through tenth aspects, the time offset is less than a threshold value, and the beam that is determined corresponds to a beam used to monitor a control resource set having a lowest identifier among identifiers of a plurality of control resource sets monitored.

In a twelfth aspect, alone or in combination with one or more of the first through eleventh aspects, process 400 further includes receiving (e.g., using antenna 252, DEMOD 254, MIMO detector 256, receive processor 258, controller/ processor 280, reception module 604, and/or the like) the indication of the activated TCI state in a case where the downlink control information that schedules the downlink transmission is carried in a control resource set for which TCI indication in downlink control information is not enabled, and receiving (e.g., using antenna 252, DEMOD 254, MIMO detector 256, receive processor 258, controller/ processor 280, reception module 604, and/or the like) the indication of the activated TCI state in a case where the downlink control information that schedules the downlink transmission is carried in a control resource set for which TCI indication in downlink control information is enabled. In a thirteenth aspect, alone or in combination with one or more of the first through twelfth aspects, the indication of the activated TCI state is received with another indication of another activated TCI state for receiving a control transmission, and the activated TCI state corresponds to the other activated TCI state.

As further shown in FIG. 4, in some aspects, process 400 may include receiving the downlink transmission using the beam (block 440). For example, the UE (e.g., using antenna 252, DEMOD 254, MIMO detector 256, receive processor 258, controller/processor 280, reception module 604, and/or the like) may receive the downlink transmission using the beam, as described above in connection with FIG. 3.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
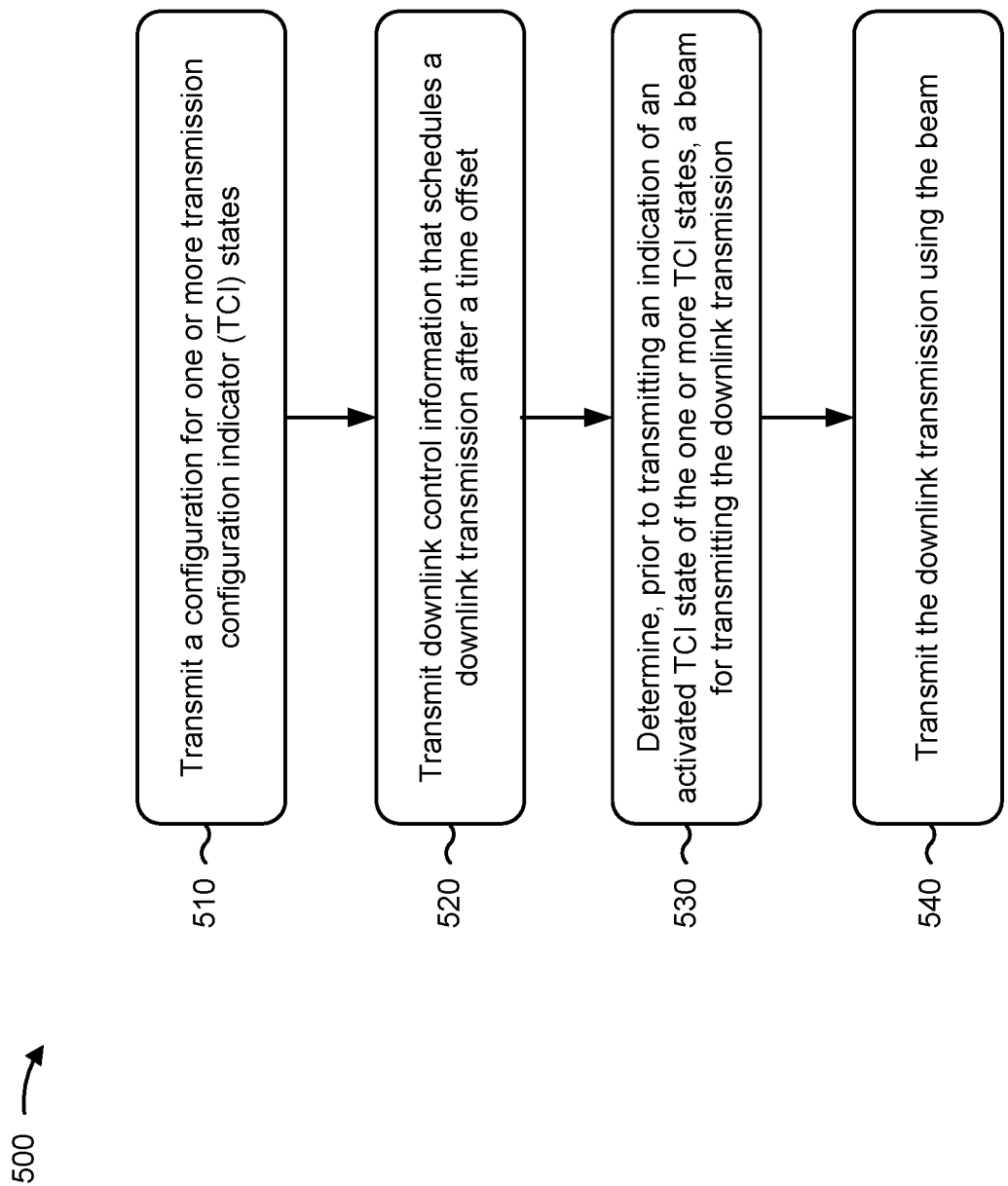
FIG. 5 is a diagram illustrating an example process performed, for example, by a base station, in accordance with various aspects of the present disclosure.

FIG. 5 is a diagram illustrating an example process 500 performed, for example, by a BS, in accordance with various aspects of the present disclosure. Example process 500 is an example where a BS (e.g., BS 110 and/or the like) performs operations associated with beam determination prior to an indication of an activated beam.

As shown in FIG. 5, in some aspects, process 500 may include transmitting a configuration for one or more TCI states (block 510). For example, the BS (e.g., using controller/processor 240, transmit processor 220, TX MIMO processor 230, MOD 232, antenna 234, transmission module 804, and/or the like) may transmit a configuration for one or more TCI states, as described above in connection with FIG. 3.

As further shown in FIG. 5, in some aspects, process 500 may include transmitting downlink control information that schedules a downlink transmission after a time offset (block 520). For example, the BS (e.g., using controller/processor 240, transmit processor 220, TX MIMO processor 230, MOD 232, antenna 234, transmission module 804, and/or the like) may transmit downlink control information that schedules a downlink transmission after a time offset, as described above in connection with FIG. 3. In a first aspect, the downlink transmission is carried in a physical downlink shared channel for data. In a second aspect, alone or in combination with the first aspect, the time offset is an interval between a first time when the downlink control information that schedules the downlink transmission is received by the UE and a second time when the downlink transmission is scheduled.

As further shown in FIG. 5, in some aspects, process 500 may include determining, prior to transmitting an indication of an activated TCI state of the one or more TCI states, a beam for transmitting the downlink transmission (block 530). For example, the BS (e.g., using controller/processor 240, determination module 806, and/or the like) may determine, prior to transmitting an indication of an activated TCI state of the one or more TCI states, a beam for transmitting the downlink transmission, as described above in connection with FIG. 3.

In a third aspect, alone or in combination with one or more of the first and second aspects, the time offset is greater than a threshold value and the downlink control information that schedules the downlink transmission is carried in a control resource set for which TCI indication in downlink control information is not enabled, and the beam that is determined corresponds to a beam used to transmit a synchronization signal block in an initial access procedure. In a fourth aspect, alone or in combination with one or more of the first through third aspects, process 500 further includes transmitting (e.g., using controller/processor 240, transmit processor 220, TX MIMO processor 230, MOD 232, antenna 234, transmission module 804, and/or the like) the indication of the activated TCI state, and determining (e.g., using transmit processor 220, receive processor 238, controller/processor 240, memory 242, determination module 806, and/or the like) another beam that corresponds to a beam used to transmit the downlink control information. In a fifth aspect, alone or in combination with one or more of the first through fourth aspects, the time offset is greater than a threshold value and the downlink control information that schedules the downlink transmission is carried in a control resource set for which TCI indication in downlink control information is not enabled, and the beam that is determined corresponds to a beam used to transmit the downlink control information.

In a sixth aspect, alone or in combination with one or more of the first through fifth aspects, the time offset is greater than a threshold value and the downlink control information that schedules the downlink transmission is carried in a control resource set for which TCI indication in downlink control information is enabled, and the beam that is determined corresponds to a beam used to transmit a synchronization signal block in an initial access procedure. In a seventh aspect, alone or in combination with one or more of the first through sixth aspects, the time offset is greater than a threshold value and the downlink control information that schedules the downlink transmission is carried in a control resource set for which TCI indication in downlink control information is enabled, and the beam that is determined corresponds to a beam used to transmit the downlink control information.

In an eighth aspect, alone or in combination with one or more of the first through seventh aspects, the time offset is less than a threshold value, and the beam that is determined corresponds to a beam used to transmit a synchronization signal block in an initial access procedure. In a ninth aspect, alone or in combination with one or more of the first through eighth aspects, process 500 further includes transmitting (e.g., using controller/processor 240, transmit processor 220, TX MIMO processor 230, MOD 232, antenna 234, transmission module 804, and/or the like) the indication of the activated TCI state, and determining another beam based at least in part on a control resource set. In a tenth aspect, alone or in combination with one or more of the first through ninth aspects, the control resource set has a lowest identifier among identifiers of a plurality of control resource sets in a most recent slot that is monitored by a UE. In an eleventh aspect, alone or in combination with one or more of the first through tenth aspects, the time offset is less than a threshold value, and the beam is determined based at least in part on a control resource set having a lowest identifier among identifiers of a plurality of control resource sets monitored by a UE.

In a twelfth aspect, alone or in combination with one or more of the first through eleventh aspects, process 500 further includes transmitting (e.g., using controller/processor 240, transmit processor 220, TX MIMO processor 230, MOD 232, antenna 234, transmission module 804, and/or the like) the indication of the activated TCI state in a case where the downlink control information that schedules the downlink transmission is carried in a control resource set for which TCI indication in downlink control information is not enabled, and transmitting (e.g., using controller/processor 240, transmit processor 220, TX MIMO processor 230, MOD 232, antenna 234, transmission module 804, and/or the like) the indication of the activated TCI state in a case where the downlink control information that schedules the downlink transmission is carried in a control resource set for which TCI indication in downlink control information is enabled. In a thirteenth aspect, alone or in combination with one or more of the first through twelfth aspects, the indication of the activated TCI state is transmitted with another indication of another activated TCI state for a control transmission, and the activated TCI state corresponds to the other activated TCI state.

As further shown in FIG. 5, in some aspects, process 500 may include transmitting the downlink transmission using the beam (block 540). For example, the BS (e.g., using controller/processor 240, transmit processor 220, TX MIMO processor 230, MOD 232, antenna 234, transmission module

804, and/or the like) may transmit the downlink transmission using the beam, as described above in connection with FIG. 3.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
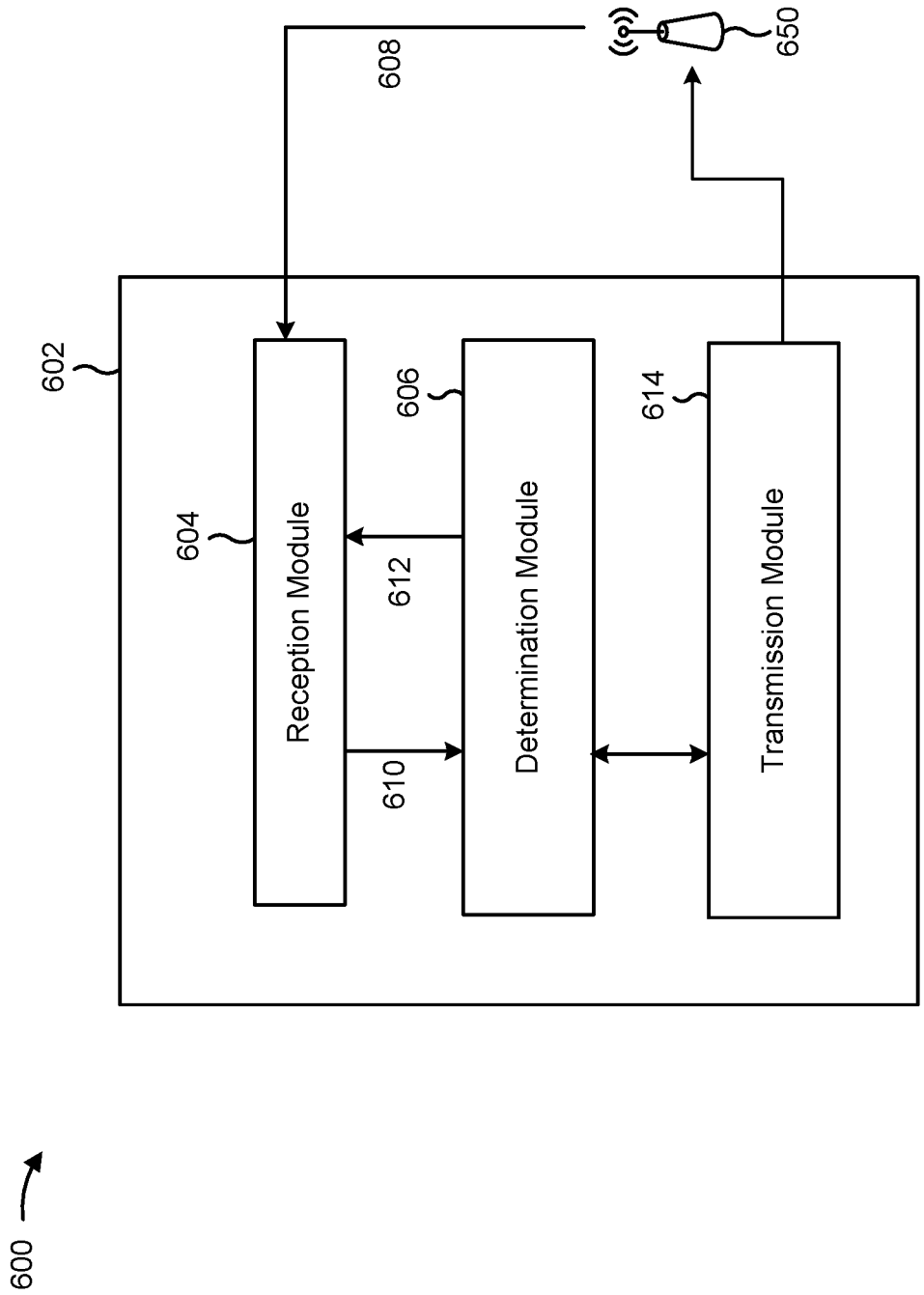
FIG. 6 is a conceptual data flow diagram illustrating an example of a data flow between different modules/means/components in an example apparatus.

FIG. 6 is a conceptual data flow diagram illustrating an example 600 of a data flow between different modules/means/components in an example apparatus 602. The apparatus 602 may include, for example, a UE (e.g., UE 120). In some aspects, the apparatus 602 includes a reception module 604, a determination module 606, a transmission module 614, and/or the like. The reception module 604 and the transmission module 614 may be in communication with one another (for example, via one or more buses and/or one or more other components). As shown, the apparatus 602 may communicate with another apparatus 650 (such as a UE, a base station, or another wireless communication device) using the reception module 604 and the transmission module 614.

In some aspects, the apparatus 602 may be configured to perform one or more operations described herein in connection with FIG. 3. Additionally or alternatively, the apparatus 602 may be configured to perform one or more processes described herein, such as process 400 of FIG. 4, or a combination thereof. In some aspects, the apparatus 602 and/or one or more modules shown in FIG. 6 may include one or more components of the UE described above in connection with FIG. 2. Additionally, or alternatively, one or more modules shown in FIG. 6 may be implemented within one or more components described above in connection with FIG. 2. Additionally or alternatively, one or more modules of the set of modules may be implemented at least in part as software stored in a memory. For example, a module (or a portion of a module) may be implemented as instructions or code stored in a non-transitory computer-readable medium and executable by a controller or a processor to perform the functions or operations of the module.

The reception module 604 may receive communications, such as reference signals, control information, data communications, or a combination thereof, from the apparatus 650. The reception module 604 may provide received communications to one or more other modules of the apparatus 602. In some aspects, the reception module 604 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other modules of the apparatus 602. In some aspects, the reception module 604 may include one or more antennas, a demodulator, a MIMO detector, a receive processor, a controller/processor, a memory, or a combination thereof, of the UE described above in connection with FIG. 2.

The transmission module 614 may transmit communications, such as reference signals, control information, data communications, or a combination thereof, to the apparatus 650. In some aspects, one or more other modules of the apparatus 602 may generate communications and may provide the generated communications to the transmission module 614 for transmission to the apparatus 650. In some aspects, the transmission module 614 may perform signal processing on the generated communications (such as filtering, amplification, modulation, digital-to-analog conversion, multiplexing, interleaving, mapping, or encoding, among other examples), and may transmit the processed signals to the apparatus 650. In some aspects, the transmission module 614 may include one or more antennas, a modulator, a transmit MIMO processor, a transmit processor, a controller/processor, a memory, or a combination thereof, of the UE described above in connection with FIG. 2. In some aspects, the transmission module 614 may be co-located with the reception module 604 in a transceiver.

In some aspects, the reception module 604 may receive, as data 608, a configuration for one or more TCI states. Additionally, or alternatively, the reception module 604 may receive, as data 608, control information that schedules a downlink transmission after a time offset. The reception module 604 may provide information regarding the configuration and/or the control information to the determination module 606 as data 610. The determination module 606 may determine, prior to receiving an indication of an activated TCI state of the one or more TCI states (e.g., prior to the reception module 604 receiving, as data 608, an indication of an activated TCI state of the one or more TCI states), a beam for receiving the downlink transmission. The determination module 606 may provide information regarding the beam to the reception module 604 as data 612. The reception module 604 may receive, as data 608, the downlink transmission using the beam to thereby communicate with an apparatus 650 (e.g., a base station) prior to activation of a TCI state for communications with the apparatus 650.

In some aspects, the time offset is greater than a threshold value and the control information that schedules the downlink transmission is carried in a control resource set for which TCI indication in control information is enabled. In some aspects, the beam that is determined corresponds to a beam used to transmit a synchronization signal block in an initial access procedure.

The apparatus 602 may include additional modules that perform each of the blocks of the aforementioned process 400 of FIG. 4 and/or the like. Each block in the aforementioned process 400 of FIG. 4, and/or the like, may be performed by a module, and the apparatus 602 may include one or more of those modules. The modules may be one or more hardware components specifically configured to carry out the stated processes, implemented by a processor configured to perform the stated processes, stored within a computer-readable medium for implementation by a processor, or some combination thereof.

The number and arrangement of modules shown in FIG. 6 are provided as an example. In practice, there may be additional modules, fewer modules, different modules, or differently arranged modules than those shown in FIG. 6. Furthermore, two or more modules shown in FIG. 6 may be implemented within a single module, or a single module shown in FIG. 6 may be implemented as multiple, distributed modules. Additionally, or alternatively, a set of modules (e.g., one or more modules) shown in FIG. 6 may perform one or more functions described as being performed by another set of modules shown in FIG. 6.

Figure 7:
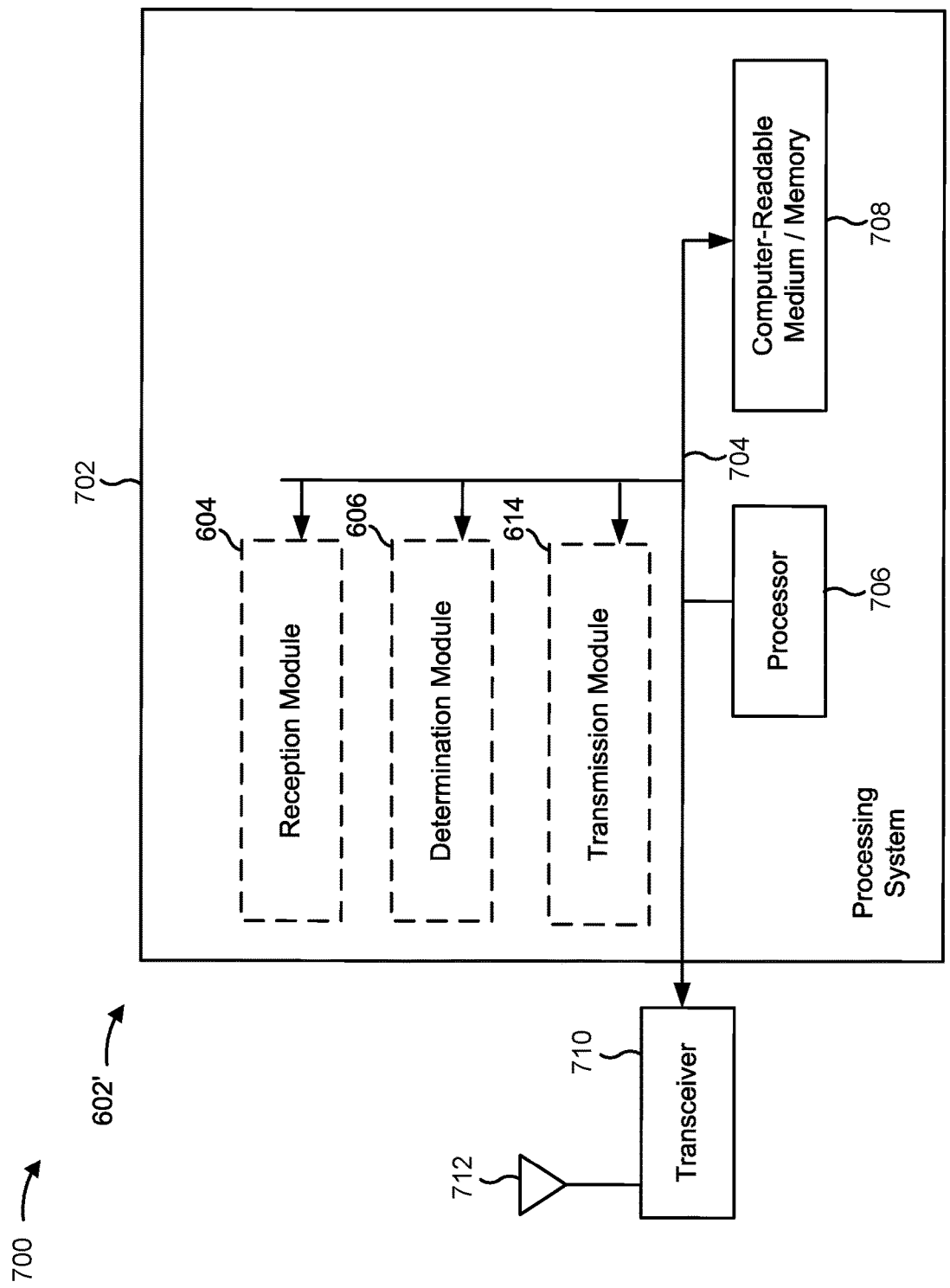
FIG. 7 is a diagram illustrating an example of a hardware implementation for an apparatus employing a processing system.

FIG. 7 is a diagram 700 illustrating an example of a hardware implementation for an apparatus 602' employing a processing system 702. The apparatus 602' may be a UE (e.g., UE 120).

The processing system 702 may be implemented with a bus architecture, represented generally by the bus 704. The bus 704 may include any number of interconnecting buses and bridges, depending on the specific application of the processing system 702 and the overall design constraints.

The bus 704 links together various circuits including one or more processors and/or hardware modules, represented by the processor 706, the modules 604, 606, and/or 614, and the (non-transitory) computer-readable medium/memory 708. The bus 704 may also link various other circuits such as timing sources, peripherals, voltage regulators, and power management circuits, which are well known in the art, and therefore will not be described any further.

The processing system 702 may be coupled to a transceiver 710. The transceiver 710 is coupled to one or more antennas 712. The transceiver 710 provides a means for communicating with various other apparatuses over a transmission medium. For example, the transceiver 710 receives a signal from the one or more antennas 712, extracts information from the received signal, and provides the extracted information to the processing system 702, specifically the reception module 604. As another example, the transceiver 710 receives information from the processing system 702, specifically the transmission module 614, and based at least in part on the received information, generates a signal to be applied to the one or more antennas 712. The processing system 702 includes a processor 706 coupled to a computer-readable medium/memory 708. The processor 706 is responsible for general processing, including the execution of software stored on the computer-readable medium/memory 708. The software, when executed by the processor 706, causes the processing system 702 to perform the various functions described herein for any particular apparatus. The computer-readable medium/memory 708 may also be used for storing data that is manipulated by the processor 706 when executing software. The processing system further includes at least one of the modules 604, 606, 614, and/or the like. The modules may be software modules running in the processor 706, resident/stored in the computer readable medium/memory 708, one or more hardware modules coupled to the processor 706, or some combination thereof. The processing system 702 may be a component of the UE 120 and may include the memory 282 and/or at least one of the TX MIMO processor 266, the receive processor 258, and/or the controller/processor 280.

In some aspects, the apparatus 602/602' for wireless communication includes means for receiving a configuration for one or more TCI states, means for receiving control information that schedules a downlink transmission after a time offset, means for determining, prior to receiving an indication of an activated TCI state of the one or more TCI states, a beam for receiving the downlink transmission, means for receiving the downlink transmission using the beam, and/or the like. The aforementioned means may be one or more of the aforementioned modules of the apparatus 602 and/or the processing system 702 of the apparatus 602' configured to perform the functions recited by the aforementioned means.

FIG. 7 is provided as an example. Other examples may differ from what is described in connection with FIG. 7.

Figure 8:
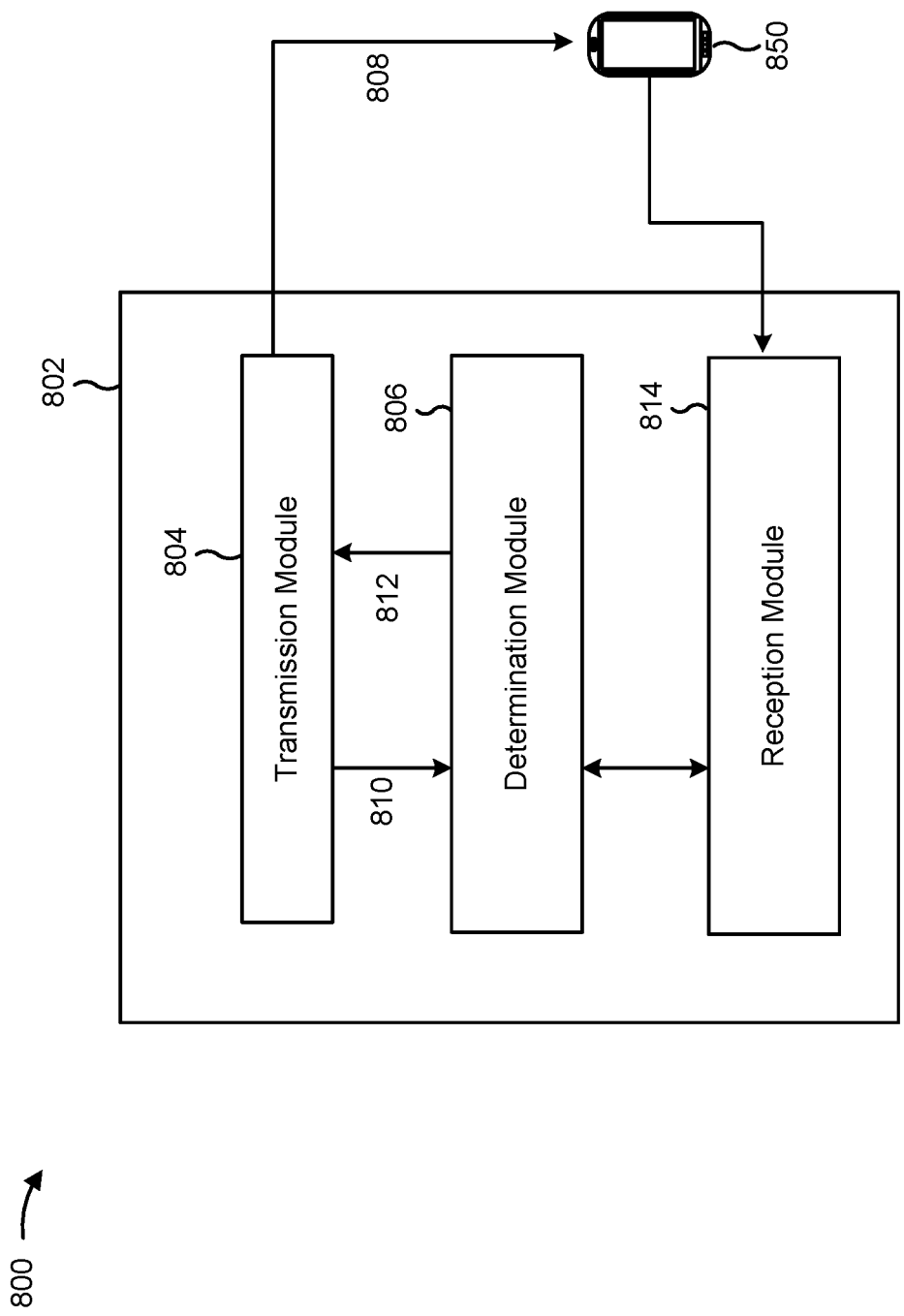
FIG. 8 is a conceptual data flow diagram illustrating an example of a data flow between different modules/means/components in an example apparatus.

FIG. 8 is a conceptual data flow diagram illustrating an example 800 of a data flow between different modules/means/components in an example apparatus 802. The apparatus 802 may include, for example, a BS (e.g., BS 110). In some aspects, the apparatus 802 includes a transmission module 804, a determination module 806, a reception module 814, and/or the like. The reception module 814 and the transmission module 804 may be in communication with one another (for example, via one or more buses and/or one or more other components). As shown, the apparatus 802 may communicate with another apparatus 850 (such as a UE, a base station, or another wireless communication device) using the reception module 814 and the transmission module 804.

In some aspects, the apparatus 802 may be configured to perform one or more operations described herein in connection with FIG. 3. Additionally or alternatively, the apparatus 802 may be configured to perform one or more processes described herein, such as process 500 of FIG. 5, or a combination thereof. In some aspects, the apparatus 802 and/or one or more modules shown in FIG. 8 may include one or more components of the UE described above in connection with FIG. 2. Additionally, or alternatively, one or more modules shown in FIG. 8 may be implemented within one or more components described above in connection with FIG. 2. Additionally or alternatively, one or more modules of the set of modules may be implemented at least in part as software stored in a memory. For example, a module (or a portion of a module) may be implemented as instructions or code stored in a non-transitory computer-readable medium and executable by a controller or a processor to perform the functions or operations of the module.

The reception module 814 may receive communications, such as reference signals, control information, data communications, or a combination thereof, from the apparatus 850. The reception module 814 may provide received communications to one or more other modules of the apparatus 802. In some aspects, the reception module 814 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other modules of the apparatus 802. In some aspects, the reception module 814 may include one or more antennas, a demodulator, a MIMO detector, a receive processor, a controller/processor, a memory, or a combination thereof, of the UE described above in connection with FIG. 2.

The transmission module 804 may transmit communications, such as reference signals, control information, data communications, or a combination thereof, to the apparatus 850. In some aspects, one or more other modules of the apparatus 802 may generate communications and may provide the generated communications to the transmission module 804 for transmission to the apparatus 850. In some aspects, the transmission module 804 may perform signal processing on the generated communications (such as filtering, amplification, modulation, digital-to-analog conversion, multiplexing, interleaving, mapping, or encoding, among other examples), and may transmit the processed signals to the apparatus 850. In some aspects, the transmission module 804 may include one or more antennas, a modulator, a transmit MIMO processor, a transmit processor, a controller/processor, a memory, or a combination thereof, of the UE described above in connection with FIG. 2. In some aspects, the transmission module 804 may be co-located with the reception module 814 in a transceiver.

In some aspects, the transmission module 804 may transmit, as data 808, a configuration for one or more TCI states. Additionally, or alternatively, the transmission module 804 may transmit, as data 808, control information that schedules a downlink transmission after a time offset. The transmission module 804 may provide information regarding the configuration and/or the control information to the determination module 806 as data 810. The determination module 806 may determine, prior to transmitting an indication of an activated TCI state of the one or more TCI states (e.g., prior to the transmission module 804 transmitting, as data 808, an indication of an activated TCI state of the one or more TCI states), a beam for transmitting the downlink transmission. The determination module 806 may provide information regarding the beam to the transmission module 804 as data 812. The transmission module 804 may transmit, as data 808, the downlink transmission using the beam to thereby communicate with an apparatus 850 (e.g., a UE) prior to activation of a TCI state for communications with the apparatus 850.

In some aspects, the time offset is greater than a threshold value and the control information that schedules the downlink transmission is carried in a control resource set for which TCI indication in control information is enabled. In some aspects, the beam that is determined corresponds to a beam used to transmit a synchronization signal block in an initial access procedure.

The apparatus 802 may include additional modules that perform each of the blocks of the aforementioned process 500 of FIG. 5 and/or the like. Each block in the aforementioned process 500 of FIG. 5, and/or the like, may be performed by a module, and the apparatus 802 may include one or more of those modules. The modules may be one or more hardware components specifically configured to carry out the stated processes, implemented by a processor configured to perform the stated processes, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
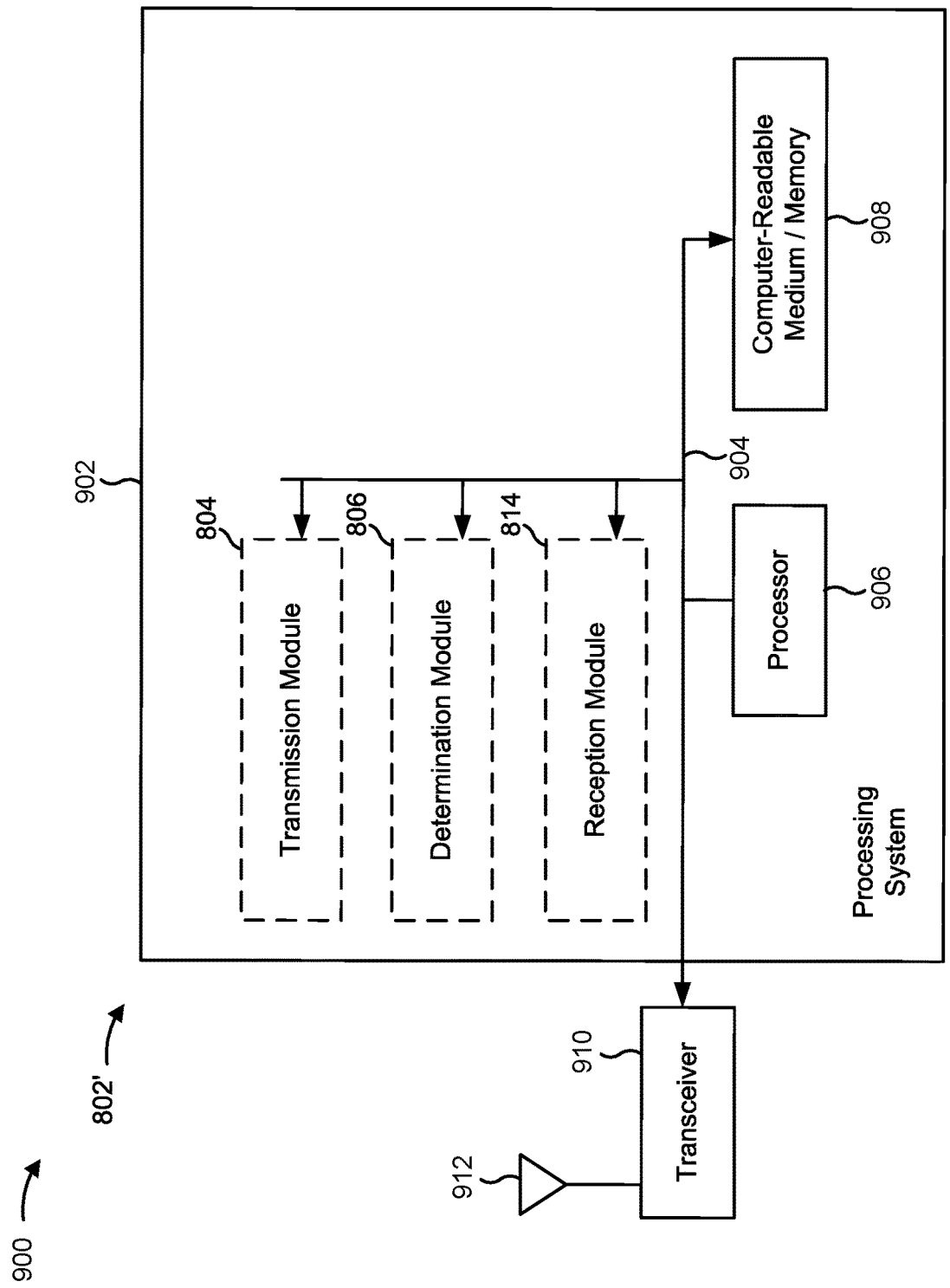
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a BS (e.g., BS 110).

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, and/or 814 and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatuses over a transmission medium. For example, the transceiver 910 receives information from the processing system 902, specifically the transmission module 804, and based at least in part on the received information, generates a signal to be applied to the one or more antennas 912. As another example, the transceiver 910 receives a signal from the one or more antennas 912, extracts information from the received signal, and provides the extracted information to the processing system 902, specifically the reception module 814. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the modules 804, 806, 814, and/or the like. The modules may be software modules running in the processor 906, resident/stored in the computer readable medium/memory 908, one or more hardware modules coupled to the processor 906, or some combination thereof. The processing system 902 may be a component of the BS 110 and may include the memory 242 and/or at least one of the TX MIMO processor 230, the receive processor 238, and/or the controller/processor 240.

In some aspects, the apparatus 802/802' for wireless communication includes means for transmitting a configuration for one or more TCI states, means for transmitting control information that schedules a downlink transmission after a time offset, means for determining, prior to transmitting an indication of an activated TCI state of the one or more TCI states, a beam for transmitting the downlink transmission, means for transmitting the downlink transmission using the beam, and/or the like. The aforementioned means may be one or more of the aforementioned modules of the apparatus 802 and/or the processing system 902 of the apparatus 802' configured to perform the functions recited by the aforementioned means.

FIG. 9 is provided as an example. Other examples may differ from what is described in connection with FIG. 9.

Figure 10:
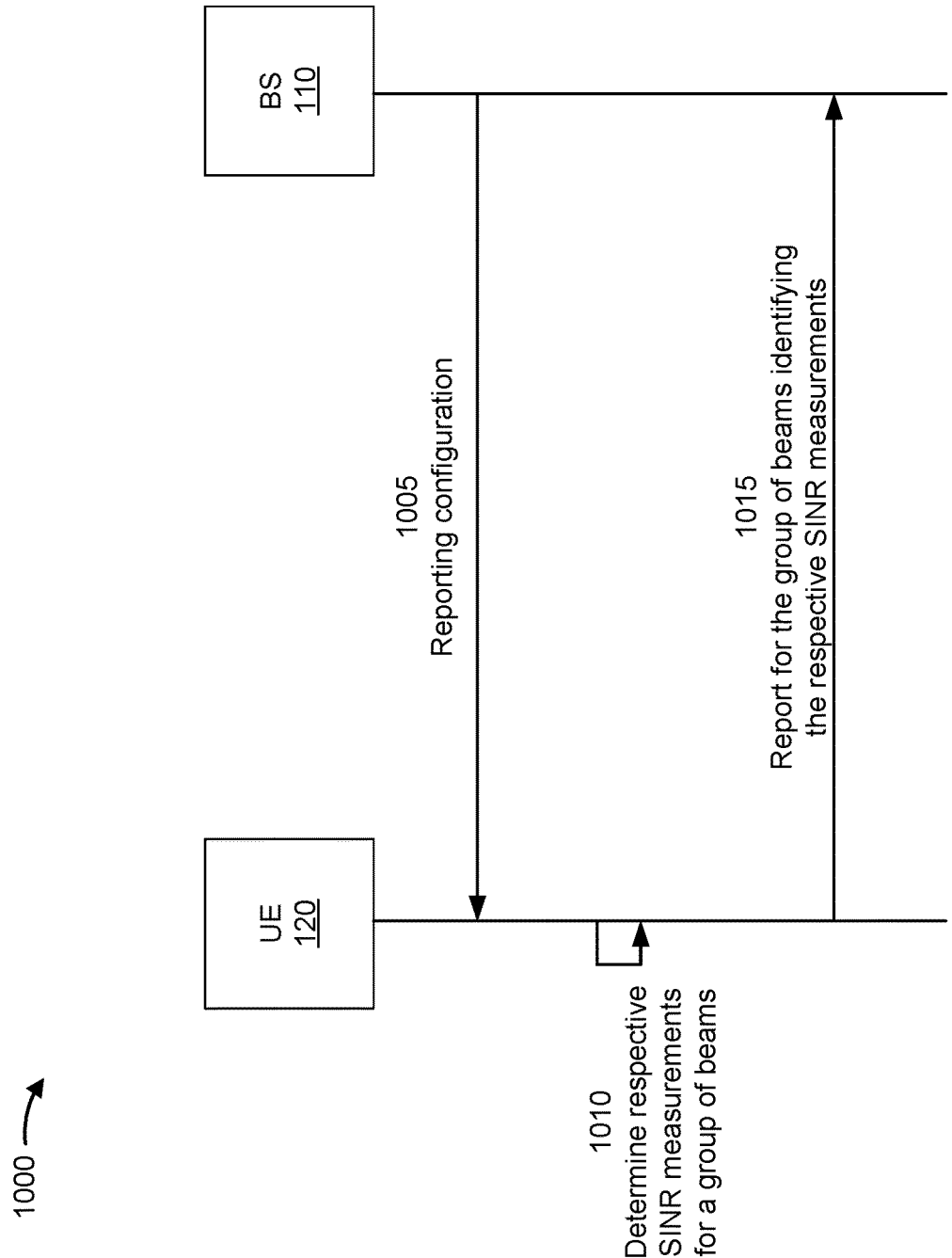
FIG. 10 is a diagram illustrating an example of beam group measurement reporting, in accordance with various aspects of the present disclosure.

FIG. 10 is a diagram illustrating an example 1000 of beam group measurement reporting, in accordance with various aspects of the present disclosure. As shown in FIG. 10, example 1000 may include a BS 110 and a UE 120 that communicate with one another.

As shown by reference number 1005, the BS 110 may transmit, and the UE 120 may receive, a reporting configuration (e.g., a CSI-ReportConfig) indicating that the UE 120 is to report signal-to-interference-plus-noise ratio (SINR) measurements. For example, the reporting configuration may include a reporting metric parameter (e.g., the higher-layer parameter report Quantity) that identifies SINR as the reporting metric of the reporting configuration (e.g., the reportQuantity parameter is set to cri-SINR or ssb-Index-SINR). In some aspects, the reporting configuration, or another configuration transmitted by the BS 110, may indicate that measurement reporting for a group of beams is enabled for the UE 120 (e.g., the higher-layer parameter groupBasedBeamReporting may be enabled).

As shown by reference number 1010, the UE 120 may determine (e.g., obtain) respective SINR measurements for a group of beams. For example, the UE 120 may determine respective layer 1 (L1) SINR (L1-SINR) measurements for the group of beams. The group of beams may include two or more beams on which the UE 120 may perform simultaneous (e.g., concurrent) transmission or reception. For example, the group of beams may include two or more beams on which the UE 120 may simultaneously receive channel state information reference signal (CSI-RS) resources, SSB resources, and/or the like.

As shown by reference number 1015, the UE 120 may transmit, and the BS 110 may receive, a report (e.g., a measurement report) for the group of beams that identifies the respective SINR measurements. In some aspects, the report may identify values for each of the respective SINR measurements. In some aspects, the values may represent actual SINR measurements for the group of beams. In some aspects, a value that is indicated in the report may be a quantized value (e.g., according to a mapping of quantized values to SINR measurement values).

In some aspects, the report may identify a value of a largest (or a smallest) SINR measurement of the respective SINR measurements. In this case, the value of the largest SINR measurement may represent an actual SINR measurement for a beam of the group of beams, and the value may be a quantized value, as described above. Additionally, the report may identify respective differential values, relative to the value of the largest SINR measurement, for a remainder of the respective SINR measurements (e.g., the respective SINR measurements other than the largest SINR measurement). A differential value for a particular SINR measurement may represent a difference between the largest SINR measurement and the particular SINR measurement. In some aspects, the differential value may be a quantized value (e.g., according to a mapping of quantized values to differential values), as described above.

As indicated above, FIG. 10 is provided as an example. Other examples may differ from what is described with respect to FIG. 10.

Figure 11:
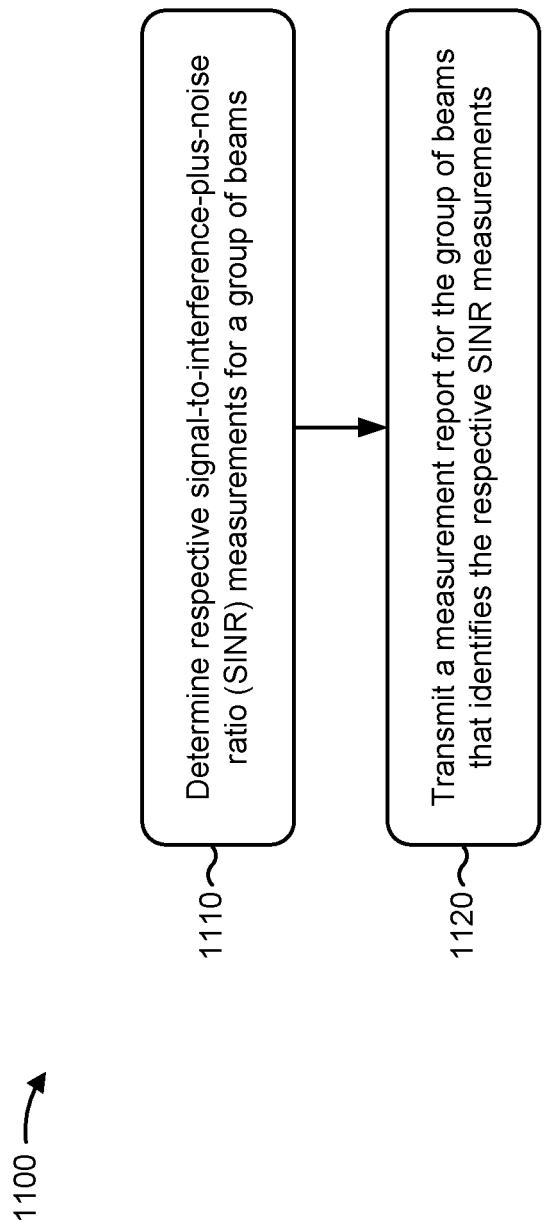
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120 and/or the like) performs operations associated with beam group measurement reporting.

As shown in FIG. 11, in some aspects, process 1100 may include determining respective signal-to-interference-plus-noise ratio (SINR) measurements for a group of beams (block 1110). For example, the UE (e.g., using antenna 252, DEMOD 254, MIMO detector 256, receive processor 258, controller/processor 280, determination component 1208, and/or the like) may determine respective signal-to-interference-plus-noise ratio (SINR) measurements for a group of beams.

As further shown in FIG. 11, in some aspects, process 1100 may include transmitting a measurement report for the group of beams that identifies the respective SINR measurements (block 1120). For example, the UE (e.g., using controller/processor 280, transmit processor 264, TX MIMO processor 266, MOD 254, antenna 252, transmission component 1204, and/or the like) may transmit a measurement report for the group of beams that identifies the respective SINR measurements.

In a first aspect, the measurement report identifies a value of a largest SINR measurement, of the respective SINR measurements, and respective differential values, relative to the value of the largest SINR measurement, for a remainder of the respective SINR measurements.

In a second aspect, alone or in combination with the first aspect, the measurement report identifies a value for each of the respective SINR measurements.

In a third aspect, alone or in combination with one or more of the first and second aspects, the UE is to perform simultaneous transmission or reception of multiple communications using the group of beams.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
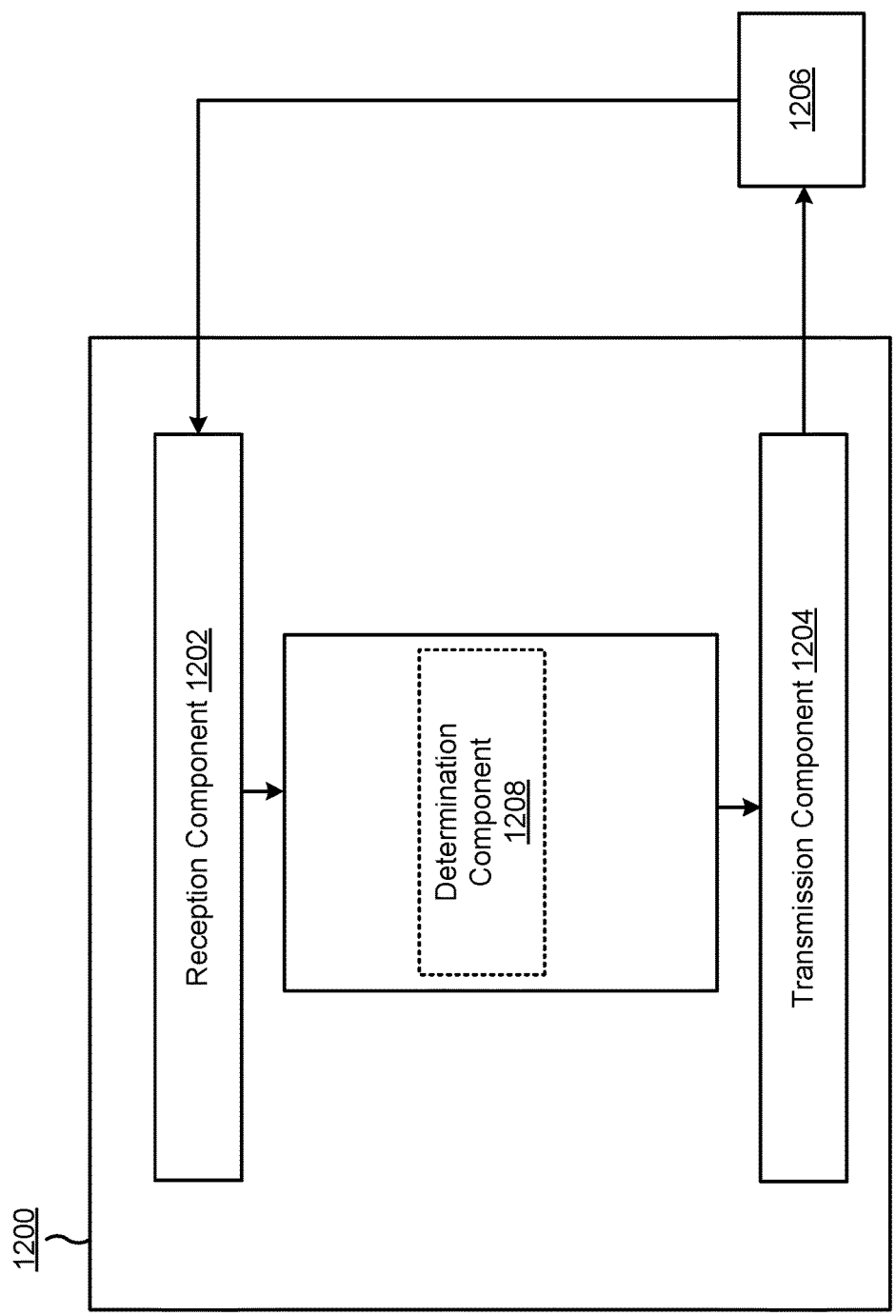
FIG. 12 is a block diagram of an example apparatus for wireless communication.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIG. 10. Additionally, or alternatively, the apparatus 1200 may be configured to perform one or more processes described herein, such as process 1100 of FIG. 11, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

In some aspects, the determination component 1208 may determine respective SINR measurements for a group of beams. In some aspects, the transmission component 1204 may transmit a measurement report for the group of beams that identifies the respective SINR measurements.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
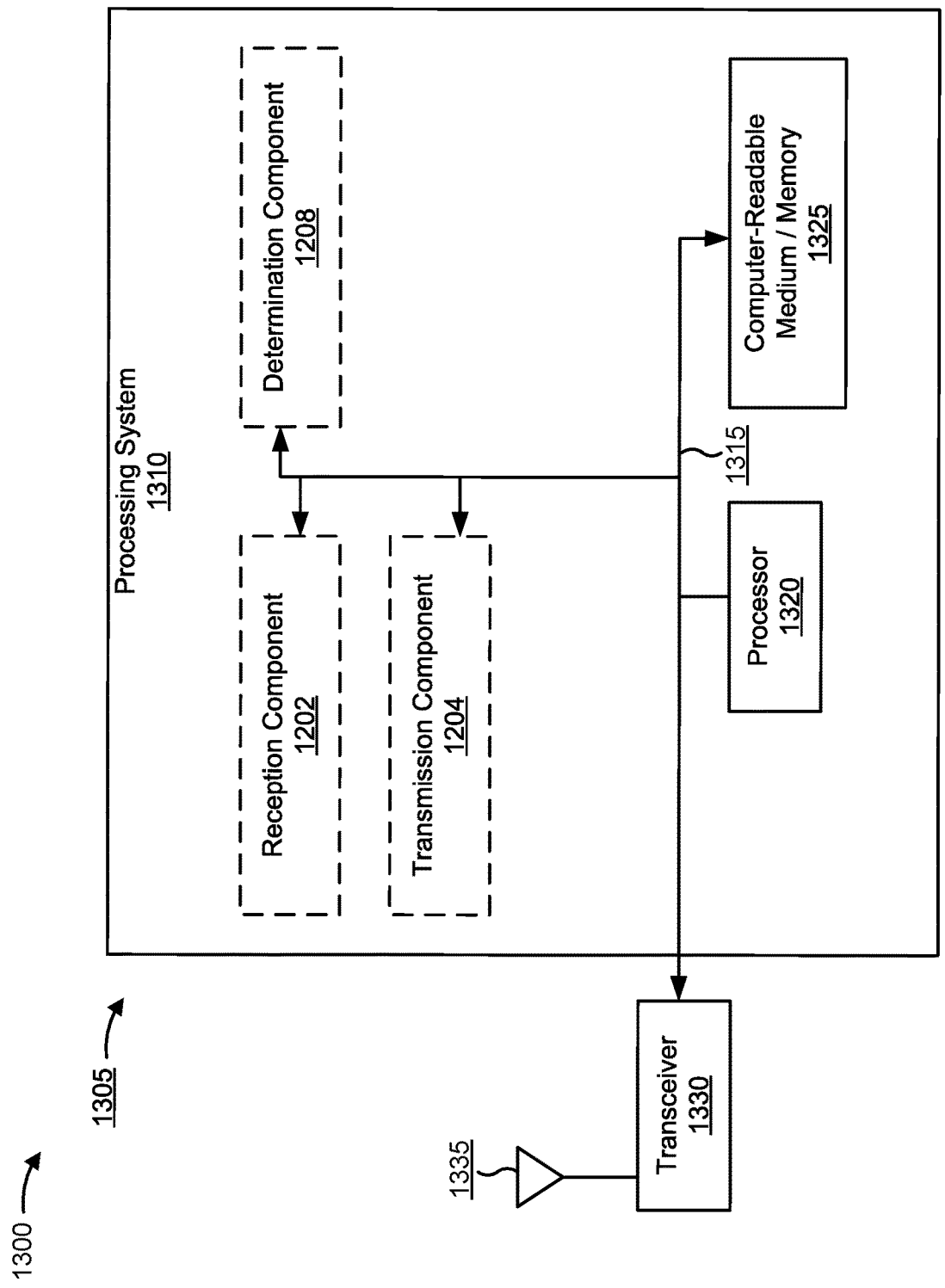
FIG. 13 is a diagram illustrating an example of a hardware implementation for an apparatus employing a processing system.

FIG. 13 is a diagram illustrating an example 1300 of a hardware implementation for an apparatus 1305 employing a processing system 1310. The apparatus 1305 may be a UE.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, power management circuits, and/or the like.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1204, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the receive (RX) processor 258, and/or the controller/processor 280. In some aspects, the apparatus 1305 for wireless communication includes means for determining respective SINR measurements for a group of beams, means for transmitting a measurement report for the group of beams that identifies the respective SINR measurements, and/or the like. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 13 is provided as an example. Other examples may differ from what is described in connection with FIG. 13.

FIG. 14 is a diagram illustrating an example process 1400 performed, for example, by a UE, in accordance with various aspects of the present disclosure. Example process 1400 is an example where a UE (e.g., UE 120 and/or the like) performs operations associated with receiving CSI in resource sets.

As shown in FIG. 14, in some aspects, process 1400 may include receiving a configuration for first non-zero power (NZP) channel state information (CSI) resource sets that are to be used for channel measurement, second NZP CSI resource sets that are to be used for interference measurement, and zero power (ZP) CSI resource sets that are to be used for interference measurement (block 1410). For example, the UE (e.g., using antenna 252, DEMOD 254, MIMO detector 256, receive processor 258, controller/processor 280, and/or the like) may receive a configuration for first non-zero power (NZP) channel state information (CSI) resource sets that are to be used for channel measurement, second NZP CSI resource sets that are to be used for interference measurement, and zero power (ZP) CSI resource sets that are to be used for interference measurement.

In a first aspect, first NZP CSI resource sets, the second NZP CSI resource sets, and the ZP CSI resource sets have a same quantity of resource sets.

In a second aspect, alone or in combination with the first aspect, a resource set of the first NZP CSI resource sets includes a different quantity of resources than a resource set of the second NZP CSI resource sets or a resource set of the ZP CSI resource sets.

As further shown in FIG. 14, in some aspects, process 1400 may include receiving the first NZP CSI in a resource set, of a particular index location, of the first NZP CSI resource sets using a beam (block 1420). For example, the UE (e.g., using receive processor 258, transmit processor 264, controller/processor 280, memory 282, and/or the like) may receive the first NZP CSI in a resource set, of a particular index location, of the first NZP CSI resource sets using a beam selected according to a quasi-colocation assumption associated with the particular index location.

As further shown in FIG. 14, in some aspects, process 1400 may include receiving the second NZP CSI in a resource set, of the particular index location, of the second NZP CSI resource sets using the beam (block 1430). For example, the UE (e.g., using receive processor 258, transmit processor 264, controller/processor 280, memory 282, and/or the like) may receive the second NZP CSI in a resource set, of the particular index location, of the second NZP CSI resource sets using the beam.

As further shown in FIG. 14, in some aspects, process 1400 may include receiving the ZP CSI in a resource set, of the particular index location, of the ZP CSI resource sets using the beam (block 1440). For example, the UE (e.g., using receive processor 258, transmit processor 264, controller/processor 280, memory 282, and/or the like) may receive the ZP CSI in a resource set, of the particular index location, of the ZP CSI resource sets using the beam.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors operatively coupled to the memory, the one or more processors configured to:
      receive a configuration for one or more transmission configuration indicator (TCI) states;
      receive downlink control information, that schedules a downlink transmission after a time offset, in a control resource set;
      prior to receiving an indication of an activated TCI state of the one or more TCI states, determine a beam for receiving the downlink transmission, according to an initial access procedure or the control resource set, based at least in part on at least one of:
         whether the time offset satisfies a threshold value, or
         whether a TCI indication for the control resource set is enabled in the downlink control information; and
      receive the downlink transmission using the beam.

2. The UE of claim 1, wherein the downlink transmission is carried in a physical downlink shared channel for data.

3. The UE of claim 1, wherein the time offset is an interval between a first time when the downlink control information that schedules the downlink transmission is received and a second time when the downlink transmission is scheduled.

4. The UE of claim 1, wherein the time offset is greater than the threshold value and the TCI indication in the downlink control information is not enabled, and
   wherein the beam that is determined corresponds to a beam used to receive a synchronization signal block in the initial access procedure.

5. The UE of claim 1, wherein the time offset is greater than the threshold value and the TCI indication in the downlink control information is enabled, and
   wherein the beam that is determined corresponds to a beam used to receive a synchronization signal block in the initial access procedure.

6. The UE of claim 1, wherein the time offset is greater than the threshold value and the TCI indication in the downlink control information is enabled, and
   wherein the beam that is determined corresponds to a beam used to monitor the control resource set.

7. The UE of claim 1, wherein the time offset is less than the threshold value, and
   wherein the beam that is determined corresponds to a beam used to receive a synchronization signal block in the initial access procedure.

8. The UE of claim 1, wherein the one or more processors are further configured to receive the indication of the activated TCI state in a case where the downlink control information that schedules the downlink transmission is carried in the control resource set for which the TCI indication in the downlink control information is not enabled, and receive the indication of the activated TCI state in a case where the downlink control information that schedules the downlink transmission is carried in the control resource set for which the TCI indication in the downlink control information is enabled.

9. The UE of claim 8, wherein the indication of the activated TCI state is received with another indication of another activated TCI state for receiving a control transmission, and
wherein the activated TCI state corresponds to the other activated TCI state.

10. A base station for wireless communication, comprising:
a memory; and
one or more processors operatively coupled to the memory, the one or more processors configured to:
transmit, to a user equipment (UE), a configuration for one or more transmission configuration indicator (TCI) states;
transmit, to the UE and in a control resource set, downlink control information that schedules a downlink transmission after a time offset;
prior to transmitting an indication of an activated TCI state of the one or more TCI states to the UE, determine a beam for transmitting the downlink transmission, according to an initial access procedure or the control resource set, based at least in part on at least one of:
whether the time offset satisfies a threshold value, or
whether a TCI indication for the control resource set is enabled in the downlink control information; and
transmit, to the UE, the downlink transmission using the beam.

11. The base station of claim 10, wherein the downlink transmission is carried in a physical downlink shared channel for data.

12. The base station of claim 10, wherein the time offset is an interval between a first time when the downlink control information that schedules the downlink transmission is received by the UE and a second time when the downlink transmission is scheduled.

13. The base station of claim 10, wherein the time offset is greater than the threshold value and the TCI indication in the downlink control information is not enabled, and
wherein the beam that is determined corresponds to a beam used to transmit a synchronization signal block in the initial access procedure.

14. The base station of claim 10, wherein the time offset is greater than the threshold value and the TCI indication in the downlink control information is enabled, and
wherein the beam that is determined corresponds to a beam used to transmit a synchronization signal block in the initial access procedure.

15. The base station of claim 10, wherein the time offset is greater than the threshold value and the TCI indication in the downlink control information is enabled, and
wherein the beam that is determined corresponds to a beam used to transmit the downlink control information.

16. The base station of claim 10, wherein the time offset is less than the threshold value, and
wherein the beam that is determined corresponds to a selected beam used to transmit a synchronization signal block in the initial access procedure.

17. The base station of claim 10, wherein the one or more processors are further configured to transmit the indication of the activated TCI state in a case where the downlink control information that schedules the downlink transmission is carried in the control resource set for which the TCI indication in the downlink control information is not enabled, and transmit the indication of the activated TCI state in a case where the downlink control information that schedules the downlink transmission is carried in the control resource set for which the TCI indication in the downlink control information is enabled.

18. The base station of claim 17, wherein the indication of the activated TCI state is transmitted with another indication of another activated TCI state for a control transmission, and
wherein the activated TCI state corresponds to the other activated TCI state.

19. A method of wireless communication performed by a user equipment (UE), comprising:
receiving a configuration for one or more transmission configuration indicator (TCI) states;
receiving downlink control information, that schedules a downlink transmission after a time offset, in a control resource set;
prior to receiving an indication of an activated TCI state of the one or more TCI states, determining a beam for receiving the downlink transmission, according to an initial access procedure or the control resource set, based at least in part on at least one of:
whether the time offset satisfies a threshold value, or
whether a TCI indication for the control resource set is enabled in the downlink control; and
receiving the downlink transmission using the beam.

20. The method of claim 19, wherein the downlink transmission is carried in a physical downlink shared channel for data.

21. The method of claim 19, wherein the time offset is an interval between a first time when the downlink control information that schedules the downlink transmission is received and a second time when the downlink transmission is scheduled.

22. The method of claim 19, wherein the time offset is greater than the threshold value and the TCI indication in the downlink control information is enabled, and
wherein the beam that is determined corresponds to a beam used to receive a synchronization signal block in the initial access procedure.

23. The method of claim 19, further comprising receiving the indication of the activated TCI state in a case where the downlink control information that schedules the downlink transmission is carried in the control resource set for which the TCI indication in the downlink control information is not enabled, and receiving the indication of the activated TCI state in a case where the downlink control information that schedules the downlink transmission is carried in the control resource set for which the TCI indication in the downlink control information is enabled.

24. The method of claim 23, wherein the indication of the activated TCI state is received with another indication of another activated TCI state for receiving a control transmission, and
wherein the activated TCI state corresponds to the other activated TCI state.

25. A method of wireless communication performed by a base station, comprising:
transmitting, to a user equipment (UE), a configuration for one or more transmission configuration indicator (TCI) states;
transmitting, to the UE and in a control resource set, downlink control information that schedules a downlink transmission after a time offset;

prior to transmitting an indication of an activated TCI state of the one or more TCI states to the UE, determining a beam for transmitting the downlink transmission, according to an initial access procedure or the control resource set, based at least in part on at least one of;
whether the time offset satisfies a threshold value, or whether a TCI indication for the control resource set is enabled in the downlink control information; and
transmitting, to the UE, the downlink transmission using the beam.

26. The method of claim 25, wherein the downlink transmission is carried in a physical downlink shared channel for data.

27. The method of claim 25, wherein the time offset is an interval between a first time when the downlink control information that schedules the downlink transmission is received by the UE and a second time when the downlink transmission is scheduled.

28. The method of claim 25, wherein the time offset is greater than the threshold value and the TCI indication in the downlink control information is enabled, and
wherein the beam that is determined corresponds to a beam used to transmit a synchronization signal block in the initial access procedure.

29. The method of claim 25, further comprising transmitting the indication of the activated TCI state in a case where the downlink control information that schedules the downlink transmission is carried in the control resource set for which the TCI indication in the downlink control information is not enabled, and transmitting the indication of the activated TCI state in a case where the downlink control information that schedules the downlink transmission is carried in the control resource set for which the TCI indication in the downlink control information is enabled.

30. The method of claim 29, wherein the indication of the activated TCI state is transmitted with another indication of another activated TCI state for a control transmission, and
wherein the activated TCI state corresponds to the other activated TCI state.

31. A method of wireless communication performed by a user equipment (UE), comprising:
determining respective signal-to-interference-plus-noise ratio (SINR) measurements for a group of beams; and
transmitting, based at least in part on a receiving a reporting configuration associated with reporting the SINR measurements for the group of beams, a measurement report for the group of beams that identifies the respective SINR measurements.

32. The method of claim 31, wherein the measurement report identifies a value of a largest SINR measurement, of the respective SINR measurements, and respective differential values, relative to the value of the largest SINR measurement, for a remainder of the respective SINR measurements.

33. The method of claim 31, wherein the measurement report identifies a value for each of the respective SINR measurements.

34. The method of claim 31, wherein the UE is to perform simultaneous transmission or reception of multiple communications using the group of beams.

35. A user equipment (UE) for wireless communication, comprising:
a memory; and
one or more processors coupled to the memory, the one or more processors configured to:
determine respective signal-to-interference-plus-noise ratio (SINR) measurements for a group of beams; and
transmit, based at least in part on a receiving a reporting configuration associated with reporting the SINR measurements for the group of beams, a measurement report for the group of beams that identifies the respective SINR measurements.

36. The UE of claim 35, wherein the measurement report identifies a value of a largest SINR measurement, of the respective SINR measurements, and respective differential values, relative to the value of the largest SINR measurement, for a remainder of the respective SINR measurements.

37. The UE of claim 35, wherein the measurement report identifies a value for each of the respective SINR measurements.

38. The UE of claim 35, wherein the UE is to perform simultaneous transmission or reception of multiple communications using the group of beams.

39. A non-transitory computer-readable medium storing one or more instructions for wireless communication, the one or more instructions comprising:
one or more instructions that, when executed by one or more processors of a user equipment (UE), cause the one or more processors to:
determine respective signal-to-interference-plus-noise ratio (SINR) measurements for a group of beams; and
transmit, based at least in part on a receiving a reporting configuration associated with reporting the SINR measurements for the group of beams, a measurement report for the group of beams that identifies the respective SINR measurements.

40. The non-transitory computer-readable medium of claim 39, wherein the measurement report identifies a value of a largest SINR measurement, of the respective SINR measurements, and respective differential values, relative to the value of the largest SINR measurement, for a remainder of the respective SINR measurements.

41. The non-transitory computer-readable medium of claim 39, wherein the measurement report identifies a value for each of the respective SINR measurements.

42. The non-transitory computer-readable medium of claim 39, wherein the UE is to perform simultaneous transmission or reception of multiple communications using the group of beams.

43. An apparatus for wireless communication, comprising:
means for determining respective signal-to-interference-plus-noise ratio (SINR) measurements for a group of beams; and
means for transmitting, based at least in part on a receiving a reporting configuration associated with reporting the SINR measurements for the group of beams, a measurement report for the group of beams that identifies the respective SINR measurements.

44. The apparatus of claim 43, wherein the measurement report identifies a value of a largest SINR measurement, of the respective SINR measurements, and respective differential values, relative to the value of the largest SINR measurement, for a remainder of the respective SINR measurements.

45. The apparatus of claim 43, wherein the measurement report identifies a value for each of the respective SINR measurements.

46. The apparatus of claim 43, wherein the apparatus is to perform simultaneous transmission or reception of multiple communications using the group of beams.

\* \* \* \* \*